United States Patent
Gandhi et al.

(10) Patent No.: US 10,677,310 B2
(45) Date of Patent: Jun. 9, 2020

(54) VIBRATION ISOLATOR MECHANISM WITH ADJUSTABLE FORCE APPLICATION MECHANISM

(71) Applicant: Toyota Motor Engineering & Manufacturing North America, Inc., Erlanger, KY (US)

(72) Inventors: Umesh N. Gandhi, Farmington Hills, MI (US); Ryohei Tsuruta, Ann Arbor, MI (US); Brian J. Pinkelman, Ann Arbor, MI (US); Rajendra Singh, Dublin, OH (US); Nicholas P. Mastricola, Columbus, OH (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/841,954

(22) Filed: Dec. 14, 2017

(65) Prior Publication Data
US 2019/0186587 A1    Jun. 20, 2019

(51) Int. Cl.
*F16F 1/32* (2006.01)
*F16F 15/04* (2006.01)
(Continued)

(52) U.S. Cl.
CPC ............. *F16F 15/04* (2013.01); *F16F 1/32* (2013.01); *F16F 3/02* (2013.01); *F16F 15/002* (2013.01);
(Continued)

(58) Field of Classification Search
CPC ...... F16F 1/26; F16F 1/34; F16F 3/026; F16F 1/32; B60N 2/045; B60N 2/501; B60N 2/502; B60N 2/4242
(Continued)

(56) References Cited

U.S. PATENT DOCUMENTS 1,826,597 A * 10/1931 Brecht ................. F16F 1/32
  267/162
2,121,835 A *  6/1938 Sproul ................ B61F 5/122
  267/135
(Continued)

FOREIGN PATENT DOCUMENTS

CN    202811955    3/2013
JP    2011201378   10/2011

OTHER PUBLICATIONS

Le, Thanh Danh & Ahn, Kyoung Kwan, "A vibration isolation system in low frequency excitation region using negative stiffness structure for vehicle seat", Journal of Sound and Vibration 330 ( 2011) 6311-6335.
(Continued)

*Primary Examiner* — Christopher P Schwartz
(74) *Attorney, Agent, or Firm* — Christopher G. Darrow; Darrow Mustafa PC

(57) ABSTRACT

A vibration isolator mechanism is provided for limiting transfer of vibrations from a first element to a second element coupled to the first element. The vibration isolator mechanism may include a vibration isolator structured to provide a quasi-zero/negative stiffness response to a force applied to the vibration isolator when the applied force is within a predetermined range. The vibration isolator mechanism may also include a force application mechanism structured to apply a force to the vibration isolator. The vibration isolator mechanism may also include a force adjustment mechanism structured to adjust the force applied to the vibration isolator by the force application mechanism so that the applied force is within the predetermined range.

13 Claims, 12 Drawing Sheets

(51) Int. Cl.
*F16F 15/00* (2006.01)
*F16F 3/02* (2006.01)
*F16F 15/06* (2006.01)

(52) U.S. Cl.
CPC ........ *F16F 15/06* (2013.01); *F16F 2228/004* (2013.01); *F16F 2228/063* (2013.01)

(58) Field of Classification Search
USPC ..... 188/134, 267.1, 380; 267/131, 132, 134, 267/135, 160, 162, 174–179, 165; 248/550; 297/344.15
See application file for complete search history.

(56) References Cited

U.S. PATENT DOCUMENTS

| | | | | |
|---|---|---|---|---|
| 2,655,935 | A * | 10/1953 | Kinzbach | F16F 1/32 137/538 |
| 3,559,512 | A * | 2/1971 | Aggarwal | B23B 29/022 188/322.5 |
| 3,574,347 | A * | 4/1971 | Hughes | F16F 1/32 267/162 |
| 3,608,883 | A * | 9/1971 | Russold | F16F 1/34 267/135 |
| 3,743,266 | A | 7/1973 | Sturman et al. | |
| 3,873,079 | A * | 3/1975 | Kuus | F16F 1/32 267/162 |
| 4,168,101 | A | 9/1979 | DiGrande | |
| 4,215,841 | A | 8/1980 | Herring, Jr. | |
| 4,351,556 | A | 9/1982 | Worringer | |
| 4,530,491 | A | 7/1985 | Bucksbee et al. | |
| 5,222,709 | A | 6/1993 | Culley, Jr. et al. | |
| 5,263,694 | A * | 11/1993 | Smith | B60G 15/068 267/162 |
| 5,310,157 | A * | 5/1994 | Platus | F16F 3/026 248/619 |
| 5,669,594 | A * | 9/1997 | Platus | F16F 3/026 248/619 |
| 5,669,598 | A * | 9/1997 | Ticey | F16F 1/32 267/162 |
| 6,354,556 | B1 * | 3/2002 | Ritchie | B60N 2/501 248/421 |
| 6,935,693 | B2 * | 8/2005 | Janscha | B60N 2/502 248/550 |
| 7,152,839 | B2 | 12/2006 | Mullinix et al. | |
| 7,822,522 | B2 * | 10/2010 | Wereley | B60N 2/4242 188/267.1 |
| 8,366,082 | B2 * | 2/2013 | Evans | F16F 1/32 267/162 |
| 8,585,026 | B2 * | 11/2013 | Dittmar | F16F 1/26 267/160 |
| 9,194,452 | B2 * | 11/2015 | Hawkins | F16F 1/3615 |
| 2004/0245830 | A1 * | 12/2004 | Scheck | B60N 2/045 297/344.15 |
| 2016/0009156 | A1 * | 1/2016 | Leonard | B60G 99/00 280/124.106 |
| 2016/0068085 | A1 | 3/2016 | Mindel et al. | |
| 2019/0186588 | A1 * | 6/2019 | Gandhi | F16F 15/12353 |
| 2019/0186589 | A1 * | 6/2019 | Gandhi | F16F 1/32 |

OTHER PUBLICATIONS

Lee, C.M. & Goverdovskiy, V.N., "A multi-stage high-speed railroad vibration isolation system with "negative" stiffness", Journal of Sound and Vibration 331 (2012) 914-921.

Lee, et al., "Position control of seat suspension with minimum stiffness", Journal of Sound and Vibration 292 (2006) 435-442.

Carella et al., "Demonstrator to show the effects of negative stiffness on the natural frequency of a simple oscillator", JMES (2008) Proceedings of the Institution of Mechanical Engineers, Part C: Journal of Mechanical Engineering Science, vol. 222 (7), pp. 1189-1192.

Le, Thanh Dahn & Ahn, Kyoung Kwan "Experimental investigation of a vibration isolation system using negative stiffness structure", International Journal of Mechanical Sciences (2013) International Journal of Mechanical Sciences 70 (2013) 99-112.

\* cited by examiner

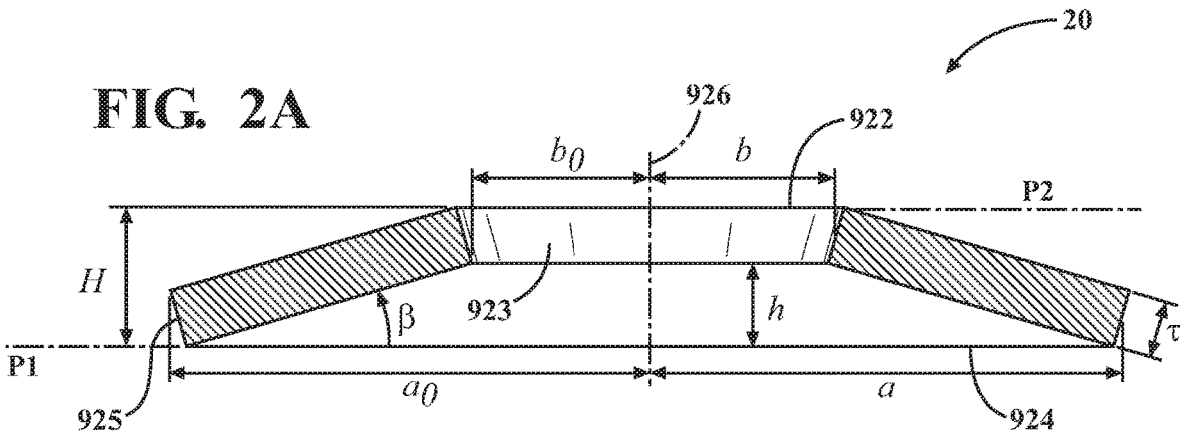
FIG. 2A
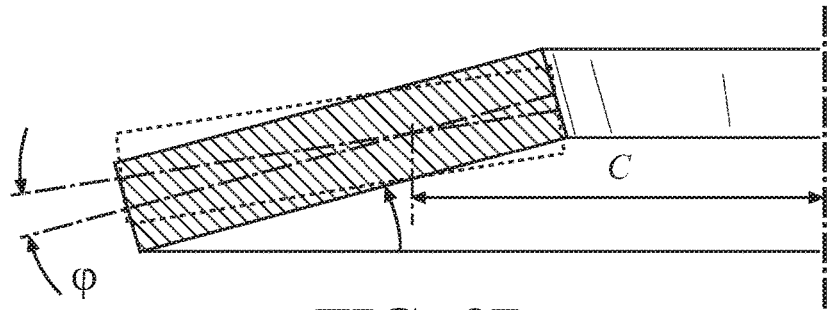
FIG. 2B
FIG. 2C
| Symbol | Standard Parameters | Symbol | Standard Parameters |
|---|---|---|---|
| $a_0$ | Outer radius | $a$ | Mid-surface outer radius |
| $b_0$ | Inner radius | $b$ | Mid-surface inner radius |
| $H$ | Spring Height | $c$ | Neutral circle redius |
| $\tau$ | Shell thickness | $h$ | Initial cone height |
| | | $\beta$ | Initial cone angle |
| | | $\varphi$ | Rotational deflection |
| | | $\delta$ | Linear deflection |

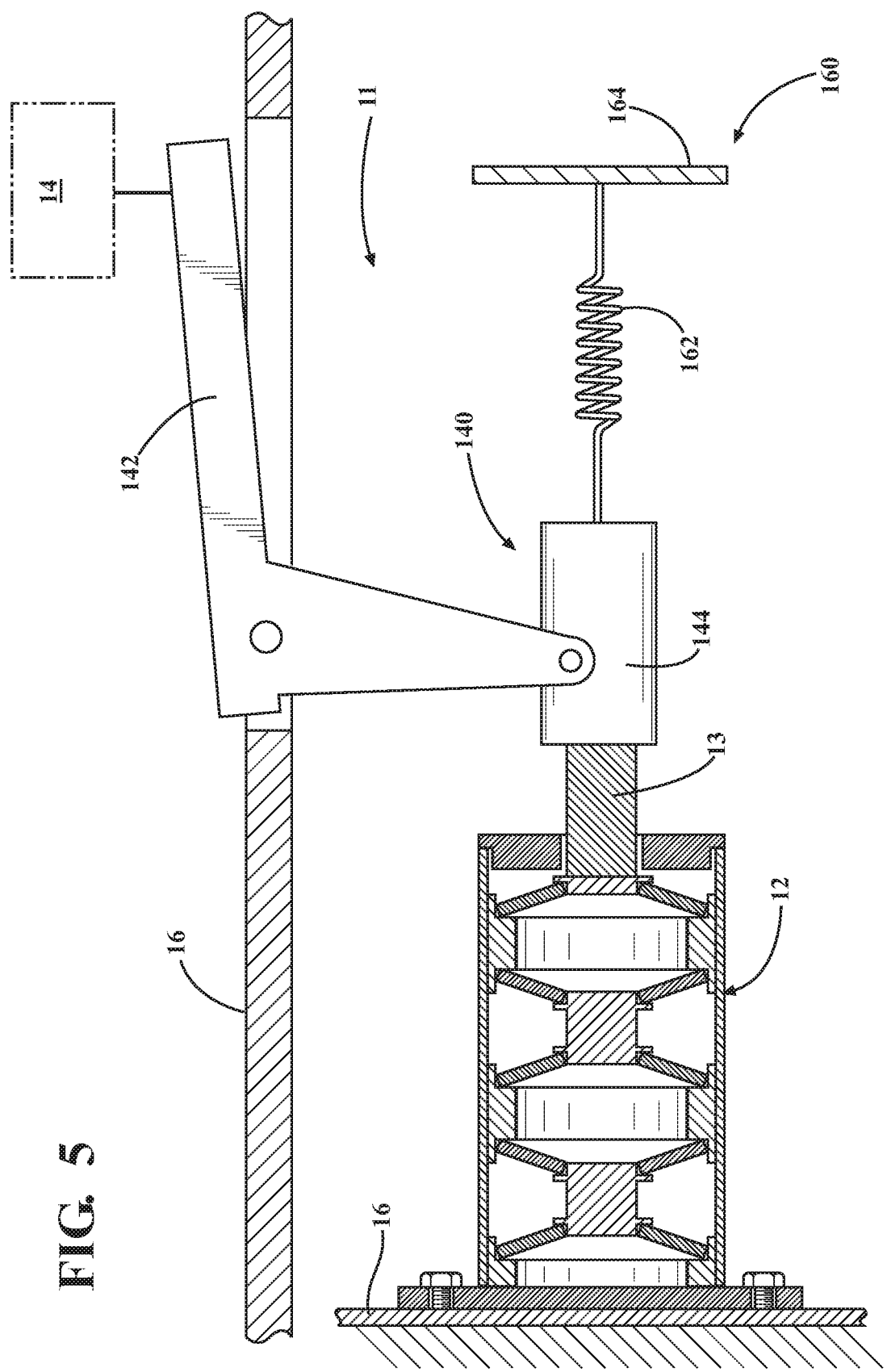

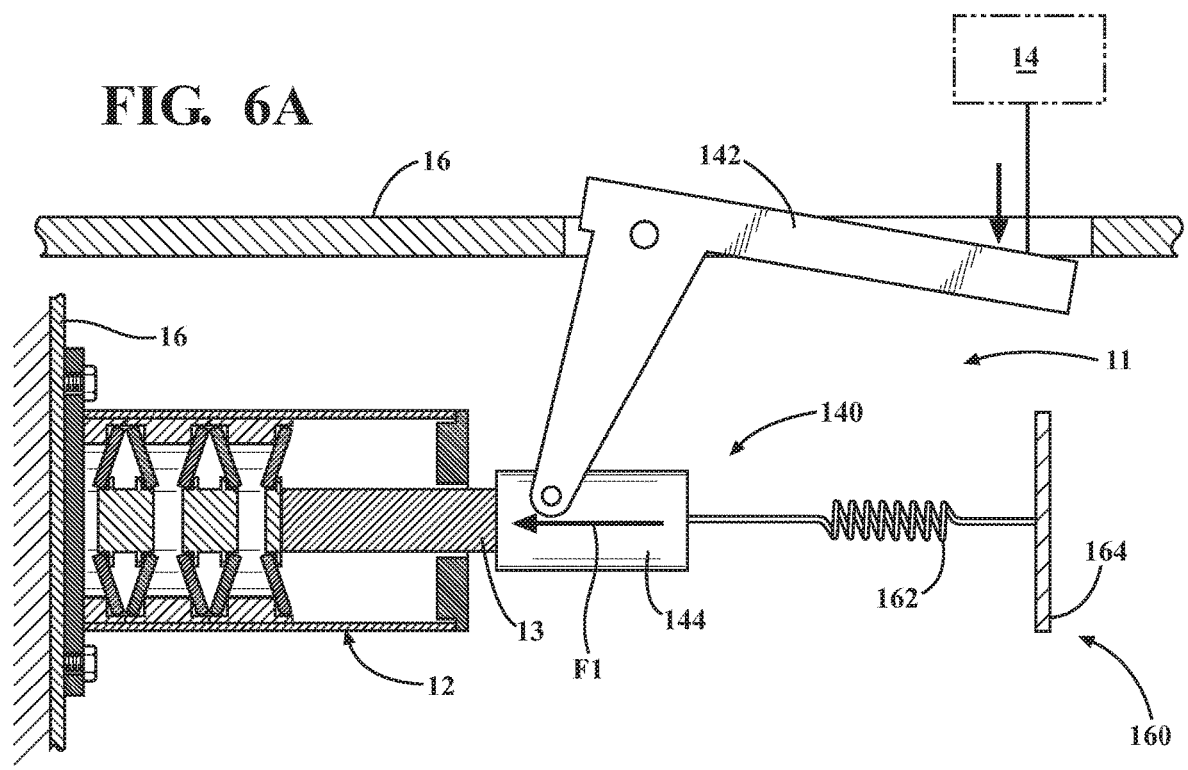
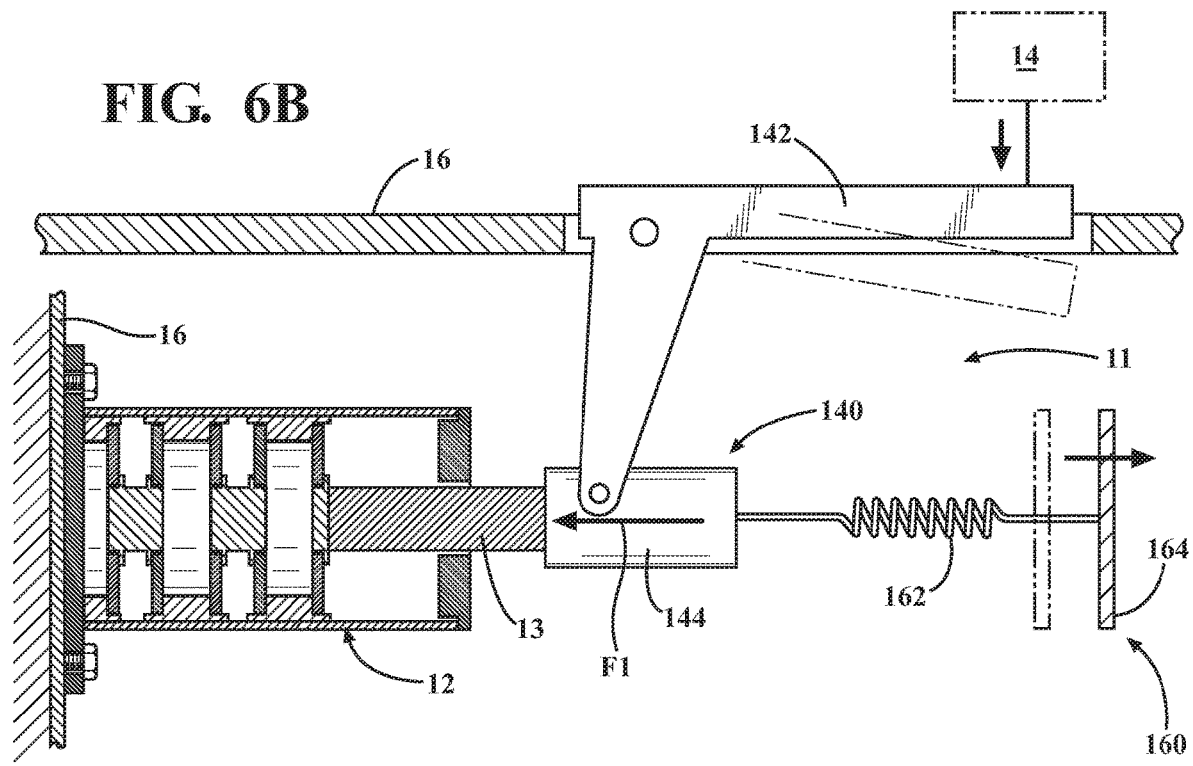

VIBRATION ISOLATOR MECHANISM WITH ADJUSTABLE FORCE APPLICATION MECHANISM

TECHNICAL FIELD

The present invention relates to systems and mechanisms in vehicles for preventing transmission of vibrations and forces causing vibrations from one portion of a vehicle to another portion of the vehicle.

BACKGROUND

It has been found that low frequency vibrations (in the range 0-10 Hz) experienced by a vehicle traveling along a road surface can be especially irritating to vehicle occupants. Forces resulting from these vibrations may be transmitted from the vehicle chassis to seats where the occupants are sitting. It can be difficult to isolate the passenger seats from these vibrations. Currently-used methods of isolating vehicle seats from such vibrations may be complex and expensive.

SUMMARY

In one aspect of the embodiments described herein, a vibration isolator mechanism is provided for limiting transfer of vibrations from a first element to a second element coupled to the first element. The vibration isolator mechanism may include a vibration isolator structured to provide a quasi-zero/negative stiffness response to a force applied to the vibration isolator when the applied force is within a predetermined range. The vibration isolator mechanism may also include a force application mechanism structured to apply a force to the vibration isolator. The vibration isolator mechanism may also include a force adjustment mechanism structured to adjust the force applied to the vibration isolator by the force application mechanism so that the applied force is within the predetermined range.

In another aspect of the embodiments described herein, a vehicle is provided which includes a vibration isolator mechanism for limiting transfer of vibrations from a first portion of the vehicle to a second portion of the vehicle. The vibration isolator mechanism may include a vibration isolator structured to provide a quasi-zero/negative stiffness response to a force applied to the vibration isolator when the applied force is within a predetermined range, a force application mechanism structured to apply a force to the vibration isolator, and a force adjustment mechanism structured to adjust the force applied to the vibration isolator by the force application mechanism so that the applied force is within the predetermined range.

In another aspect of the embodiments described herein, a method is provided for limiting transfer of vibration forces from a first element to a second element coupled to the first element. The method includes steps of: providing a vibration isolator structured to provide a quasi-zero/negative stiffness response to a force applied to the vibration isolator when the applied force is within a predetermined range; providing a force application mechanism structured to apply a force to the vibration isolator; providing a force adjustment mechanism structured to enable adjustment of the force applied to the vibration isolator so that the applied force is within the predetermined range; and during application of vibration forces to the first element, controlling the force adjustment mechanism so as to adjust a force applied to the vibration isolator by the force application mechanism to a value within the predetermined range.

BRIEF DESCRIPTION OF THE DRAWINGS

FIG. 2A is a schematic cross-sectional view showing the structure and pertinent parameters and design dimensions of a conical disc spring member in accordance with embodiments described herein.

FIG. 2B is a magnified view of a portion of the conical disc spring member shown in FIG. 2A, showing additional pertinent parameters.

FIG. 2C shows tables identifying the pertinent parameters shown in FIGS. 2A and 2B.

FIG. 5 is a schematic diagram of a vibration isolator mechanism including the vibration isolator of FIGS. 1 and 4A-4C, in a condition prior to application of a load to a vehicle seat assembly.

FIG. 6A is the schematic diagram of FIG. 5 showing the vibration isolator mechanism during a loading exceeding a force at which a quasi-zero/negative stiffness response of the conical disc spring member arrangement may be achieved.

FIG. 6B is the schematic diagram of FIG. 6A, showing application of a force by a force adjustment mechanism to decrease the force applied to the vibration isolator to a force at which a quasi-zero/negative stiffness response of the conical disc spring member arrangement may be achieved.

DETAILED DESCRIPTION

Embodiments described herein relate to a vibration isolator mechanism for limiting transfer of vibrations from a first element to a second element coupled to the first element. In one example, the first element may be a chassis of a vehicle and the second element may be a seat assembly of the vehicle. The vibration isolator mechanism may include a vibration isolator structured to provide a quasi-zero/negative stiffness response to a force applied to the vibration isolator when the applied force is within a predetermined range. A force application mechanism may be structured to apply the force to the vibration isolator. A force adjustment mechanism may be structured to adjust the force applied to the vibration isolator by the force application mechanism so that the applied force is within the predetermined range. When the force applied to the isolator is within the predetermined range, the quasi-zero/negative stiffness response of the isolator may act to attenuate or severely limit transmission of the vibration forces from the first element to the second element. In one or more arrangements, the vibration isolator includes a plurality of conical disc spring members, and a plurality of spacers separating each pair of adjacent spring members. The spacers are structured to enable inversion of the conical disc spring members during loading. Enabling the conical disc spring member to invert may increase the range of the quasi-zero/negative stiffness response in reaction to the applied force.

Figure 1:
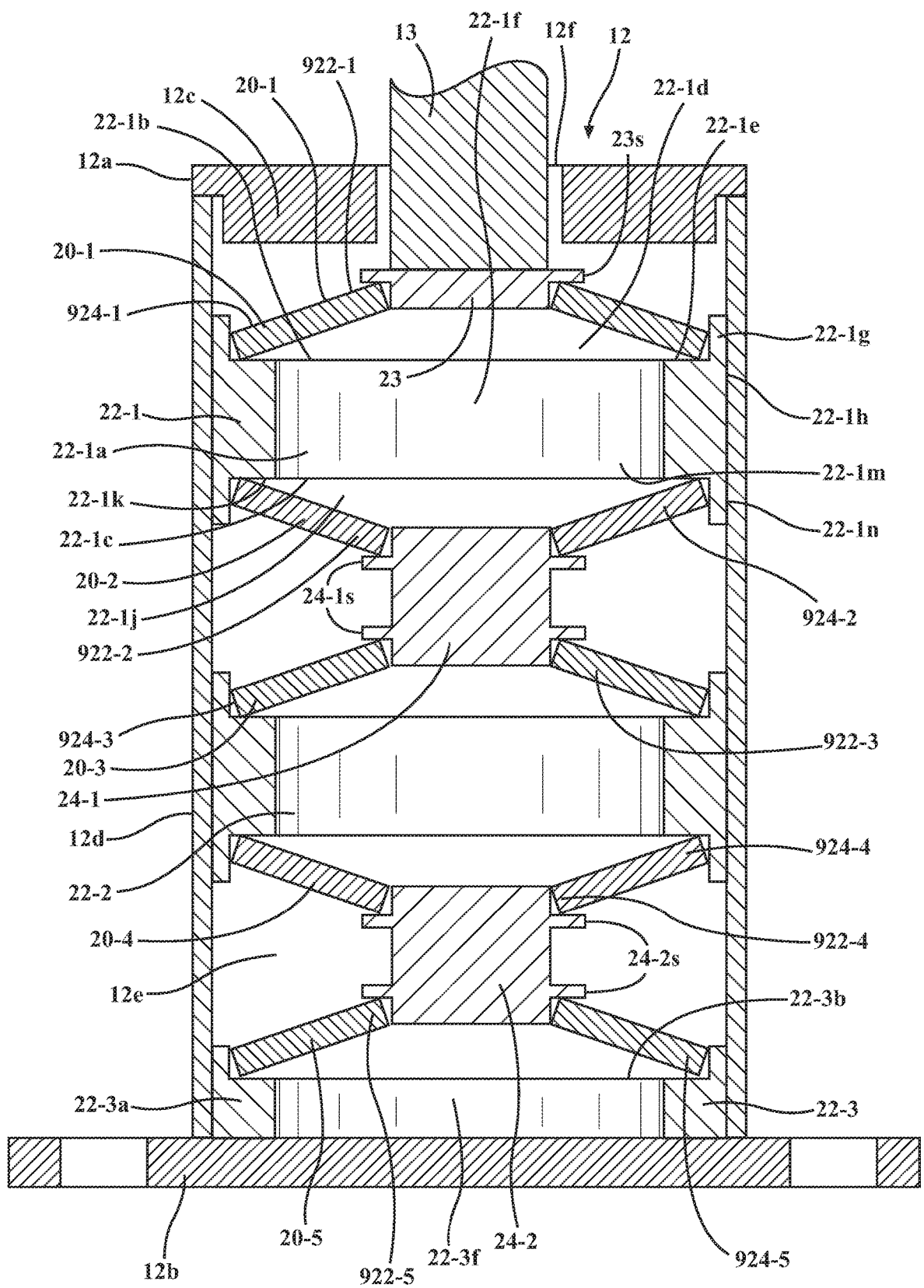
FIG. 1 shows a schematic side cross-sectional view of one embodiment of a vibration isolator in accordance with an embodiment described herein.

FIG. 1 shows a schematic side cross-sectional view of one embodiment of a vibration isolator (generally designated 12) in accordance with an embodiment described herein. The vibration isolator 12 may be incorporated into a vibration isolator mechanism 11 (as seen in FIGS. 5-7B, for example) structured and positioned for limiting transfer of vibrations from a first element to a second element coupled to the first element. The vibration isolator mechanism 11 may be interposed between elements of a system or mechanism to vibrationally isolate the elements from each other, so that transmission of vibrations experienced by a first element of the system or mechanism to a second element of the system or mechanism is attenuated or eliminated. For example, in the embodiment shown in FIGS. 5-7B, the vibration isolator mechanism 11 is incorporated into a vehicle so as to help isolate a second element 14 (for example, a vehicle seat assembly) from vibrations experienced by a first element 16 (for example, a vehicle chassis) during movement of the vehicle along a road surface. Thus, the vibration isolator mechanism 11 may limit transfer of vibrations from a first element to a second element coupled to the first element.

Although the design and operation of the vibration isolators disclosed herein have been described as applied to a vehicle seat assembly, design particulars of an isolator structure described herein may be adapted to isolate or insulate numerous types of mounted mechanisms or elements from vibrations experienced by mounting structures to which the mounted mechanisms or elements are mounted or attached, and a vibration isolator structured in accordance with the principles described herein may be employed in a variety of other applications. For example, vehicle engines and transmission differentials may be vibrationally isolated from a vehicle frame. Non-vehicle applications may include mounting systems for equipment in manufacturing plants.

Referring to FIG. 1, in one or more arrangements, the vibration isolator 12 may include a housing 12a having a first end 12b and a second end 12c positioned opposite the first end 12b. At least one wall 12d may extend between the first and second ends 12b, 12c. Each combination of conical disc spring members 20 and spacers 22, 24 inside a housing in a given embodiment of the vibration isolator forms an associated energy-absorbing structure incorporated into the housing. The housing first end 12b, second end 12c, and the wall(s) 12d may combine to define an interior 12e of the housing. Housing 12a may contain the deflectable and movable components (such as conical disc spring members 20 and spacers 22, 24 described below) forming the various energy-absorbing structures described herein, and provides a structure which is positionable and securable between the first and second elements 16, 14 to perform the vibration isolation function.

One or more force application members 13 may be coupled to the housing 12a so as to be movable with respect to the housing 12a. The force application member(s) 13 may extend from the interior 12e of the housing 12a to an exterior of the housing 12a, for example through a hole 12f formed in housing second end 12c. The force application member(s) 13 may enable forces to be transferred between elements (such as a vehicle seat assembly 14) located exterior of the housing to the energy-absorbing structure located in the housing interior 12e. As shown in FIG. 1, a force application member 13 may contact a spacer 23 inside the housing. One or more shoulders 23s of the spacer 23 may be structured to engage a portion of an associated first conical disc spring member 20-1 adjacent a central opening in a first end of the first conical disc spring member 20-1 as shown in FIG. 1, to enable application of a force to a first end of the first conical disc spring member. Forces may be applied to the spacer 23 via force application member 13 to deflect the conical disc spring members 20. The force application member 13 may be a part of the vibration isolator 12, or the force application member 13 may be incorporated into (or in contact with) an element or mechanism to which the vehicle seat assembly 14 and the vibration isolator 12 is attached or coupled.

The vibration isolator 12 may also include a plurality of conical disc spring members, generally designated 20. The conical disc spring members 20 may have the same shape and dimensions, or the conical disc spring members 20 may have different shapes and dimensions. The conical disc spring members 20 shown in FIG. 1 have the same shapes and dimensions.

Referring to FIGS. 1 and 2A-2C, in embodiments described herein, each conical disc spring member 20 is in the shape of a truncated, right circular cone. The general shape is known in the pertinent art in the form of a Belleville washer or conical disc washer, for example. Each conical disc spring member 20 has an associated first end 922 including a central opening 923 of the conical disc spring member 20, and a second end 924 opposite the first end 922. The second end 924 defines a circular base of the conical structure and includes an outer edge 925 of the conical disc spring member 20. A central axis 926 of each conical disc spring member 20 extends through a center of the central opening 923 and also through a center of the circular base 924. Also, the base 924 extends along a flat plane P1, and the central opening 923 extends along a flat plane P2 (which truncates the conical structure) parallel to the plane P1, with the central axis 926 extending perpendicular to plane P1 and also extending perpendicular to plane P2. In the embodiments shown in the drawings, the conical disc spring members 20 incorporated into the structure of the vibration isolator 12 are coaxially-aligned along the central axes 926 of the conical disc spring members 20.

Conical disc spring members 20 may be in the form of Belleville washers or similar structures designed or selected in accordance with the design parameters and considerations described herein, so as to provide the desired force-deflection characteristics. As is known, such structures act as spring members when a load is applied at either or both of the first end and the second end of the conical disc spring members, where the applied loading acts to deflect one of the first end 922 and the second end 924 in a direction toward the other of the first end 922 and the second end 924.

Referring again to FIG. 1, in the embodiment shown, at least one first conical disc spring member 20-1 may be positioned in the housing 12a. First conical disc spring member 20-1 may be coupled to spacer 23 so as to enable transfer of forces between the spacer 23 (in contact with force application member 13) and the first conical disc spring member 20-1. As seen in FIG. 1, a portion of the spacer 23 may extend into the central opening 923 of a first conical disc spring member 20-1. This arrangement may aid in maintaining alignment between the first conical disc spring member 20-1 and the spacer during loading.

For purposes described herein, two conical disc spring members are understood to reside adjacent each other when the spring members are positioned immediately next to each other, with no additional spring member between the two spring members. A spacer may be interposed between each two adjacent conical disc spring members. The spacer may be structured to engage each of the adjacent conical disc spring members so as to maintain a predetermined spacing between portions of the adjacent conical disc spring members during loading of the conical disc spring members. In the manner described herein, use of the spacer may also increase the deflection which may be achieved by the vibration isolator energy-absorbing structure during loading, by providing space for the conical disc spring members in contact with the spacer to flatten and invert under loading, as shown in FIGS. 4B and 4C. The various spacers described herein may be designed and dimensioned so as not to interfere with axial movement of the spacers with respect to each other, and may also be designed so as to not interfere with deflection and inversion of any of the conical disc spring members.

Each embodiment of a spacer described herein may operate to help space apart and/or maintain alignment and other spatial relationships between any conical disc spring members 20 in contact with the spacer. The use of spacers as described herein also enables greater control of the contact interfaces within the vibration isolator. Spacer materials may be specified which have lower coefficients of friction in relation to the materials from which the conical disc spring members are formed. This may provide lower friction than would be possible with direct contact between the conical disc spring members. The conical disc spring member spacers may also include features (such as walls formed along outer edge of the spacers as described below) which act to maintain coaxial alignment of the spring members during loading of the vibration isolator.

Referring to FIG. 1, at least one first spacer 22-1 may be positioned in the housing interior 12e. FIG. 1 shows a pair of first spacers 22-1 and 22-2 positioned in housing 12a. Each of first spacers 22 (for example, first spacers 22-1 and 22-2 as shown in FIG. 1) has the same configuration. Thus, the description of spacer 22-1 set forth herein will also apply to spacer 22-2 and any other similarly configured spacers that may be incorporated into an embodiment of the vibration isolator.

The first spacer 22-1 may have a base portion 22-1a with a first side 22-1b and a second side 22-1c opposite the first side 22-1b. The first spacer 22-1 may be coupled to first conical disc spring member 20-1 along the first spacer first side 22-1b so as to enable transfer of forces between first conical disc spring member 20-1 and the first spacer 22-1.

The base portion first side 22-1b may define a first cavity 22-1d structured to receive therein a second end 924-1 of first conical disc spring member 20-1. The first cavity 22-1d may have a first cavity floor 22-1e. In the embodiment shown, first cavity 22-1d is formed by first cavity floor 22-1e and one or more walls 22g extending from the base portion 22a. The second end 924-1 of the first conical disc spring member 20-1 may be positioned in contact with the first cavity floor 22-1e. The first cavity floor 22-1e may also have a first opening 22-1f formed therein and positioned so as to reside opposite a first end of 922-1 the first conical disc spring member 20-1 when the second end 924-1 of the first conical disc spring member 20-1 is in contact with the first cavity floor 22-1e. The first opening 22-1f may be structured to receive at least a portion of the first end 922-1 of the first conical disc spring member 20-1 therein during an inversion of the first conical disc spring member 20-1 occurring during loading of the first conical disc spring member, as shown in FIG. 4C and as described herein. The opening 22-1f may lead into a through hole as shown in FIG. 1, or the opening may lead into a blind hole cavity extending into the base portion 22-1a to a depth sufficient to enable a conical disc spring member 20 to deflect into the opening and invert without contacting a bottom of the cavity.

As the second end 924-1 of the conical disc spring member 20-1 (and also the second ends of the other conical disc spring members) deflect radially inwardly and outwardly responsive to an axial loading applied to the vibration isolator, the second ends 924 and outer edges 925 of the conical disc spring members 20 may slide radially inwardly and outwardly along the surfaces (such as floor 22-1e) of the spacers with which they are in contact.

The first spacer base portion 22-1a may also include an outer edge 22-1h structured to be slidable along and with respect to housing wall(s) 12d during movement of the first spacer 22-1 within the housing 12a responsive to loading of the conical disc spring members. The base portion second side 22-1c may define a second cavity 22-1j structured to receive therein a second end 924-2 of second conical disc spring member 20-2. The second cavity 22-1j may have a second cavity floor 22-1k. In the embodiment shown, second cavity 22-1j is formed by second cavity floor 22-1k and one or more walls 22-1n extending from the base portion 22-1a along base portion second side 22-1c. The second end 924-2 of the second conical disc spring member 20-2 may be positioned in contact with the second cavity floor 22-1k. The second cavity floor 22-1k may also have a second opening 22-1m formed therein and positioned so as to reside opposite a first end 922-2 of the second conical disc spring member 20-2 when the second end 924-2 of the second conical disc spring member 20-2 is in contact with the second cavity floor 22-1k.

The second opening 22-1m may be structured to receive at least a portion of a first end 922-2 of the second conical disc spring member 20-2 therein during an inversion of the second conical disc spring member 20-2 occurring during loading of the second conical disc spring member, as described herein. The second opening 22-1*m* may lead into a through hole as shown in FIG. 1, or the opening may lead into a blind hole cavity extending into the base portion to a depth sufficient to enable a conical disc spring member to deflect into the opening without contacting a bottom of the cavity.

Second conical disc spring member 20-2 may be positioned in the housing interior 12*e*. Second conical disc spring member 20-2 may be coupled to the first spacer 22-1 along the first spacer second side 22-1*c* so as to enable transfer of a force between the first spacer 22-1 and the second conical disc spring member 20-2. The second conical disc spring member 20-2 may be coupled to the first spacer 22-1 along the first spacer second side 22-1*c* in the same manner as the first conical disc spring member 20-1 is coupled to the first spacer 22-1 along the first spacer first side 22-1*b*, as previously described.

First spacer 22-2 may have the same design as spacer 22-1. In addition, the arrangement of conical disc spring member 20-3, first spacer 22-2, and conical disc spring member 20-4 is the same as that previously described for conical disc spring member 20-1, first spacer 22-1, and conical disc spring member 20-2, and will not be repeated in detail.

Referring to FIG. 1, at least one second spacer 24 may be positioned in the housing interior 12*e*. FIG. 1 shows a pair of second spacers 24-1 and 24-2 positioned in housing 12*a*. The second spacer 24-1 may be coupled to each of conical disc spring members 20-2 and 20-3 at first ends of the conical disc spring members so as to enable transfer of forces between the conical disc spring members 20-2 and 20-3 and the second spacer 24-1. Second spacer 24-1 may be structured to engage the first end 922-2 of conical disc spring member 20-2 to enable application of a force to the conical disc spring member tending to deflect the first end 922-2 of the conical disc spring member 20-2 toward the second end 924-2 of the conical disc spring member 20-2. The second spacer 24-1 may also be structured to engage the first end 922-3 of conical disc spring member 20-3 to enable application of a force to the conical disc spring member 20-3 tending to deflect the first end 922-3 of this conical disc spring member toward the second end 924-3 of the conical disc spring member 20-3.

In one or more arrangements, second spacer 24-1 may include one or more shoulders 24-1*s* structured to engage a portion of conical disc spring member 20-2 as shown, adjacent a central opening 923-2 formed in the first end of 922-2 the spring member 20-2. Shoulder(s) 24-1*s* may also be structured to engage a portion of conical disc spring member 20-3 as shown, adjacent a central opening 923-3 formed in the first end of 922-3 the spring member 20-3.

In addition, a second spacer 24-2 may be coupled to each of conical disc spring members 20-4 and 20-5 at first ends of the conical disc spring members so as to enable transfer of forces between the conical disc spring members 20-4 and 20-5 and the second spacer 24-2. Second spacer 24-2 may be structured to engage the first end 922-4 of conical disc spring member 20-4 to enable application of a force to the conical disc spring member tending to deflect the first end 922-4 of the conical disc spring member 20-4 toward the second end 924-4 of the conical disc spring member 20-4. The second spacer 24-2 may also be structured to engage the first end 922-5 of conical disc spring member 20-5 to enable application of a force to the conical disc spring member 20-5 tending to deflect the first end 922-5 of this conical disc spring member toward the second end 924-5 of the conical disc spring member 20-5.

In one or more arrangements, second spacer 24-2 may include one or more shoulders 24-2*s* structured to engage a portion of conical disc spring member 20-4 as shown, adjacent a central opening 923-4 formed in the first end of 922-4 the spring member 20-4. Shoulder(s) 24-2*s* may also be structured to engage a portion of conical disc spring member 20-5 as shown, adjacent a central opening 923-5 formed in the first end of 922-5 the spring member 20-5.

Conical disc spring member 20-5 may be positioned in contact with housing first end 12*b* as shown. An additional spacer 22-3 having a base portion 22-3*a* and a first side 22-3*b* similar in structure to the first sides of first spacers 22-1 and 22-2 and including an opening 22-3*f* enabling conical disc spring member 20-5 to invert into the opening, as previously described. Conical disc spring member 20-5 may be positioned in contact with the housing first end 12*b* to permit the conical disc spring member 20-5 to invert during loading, as described herein.

Although the embodiment of FIG. 1 shows a certain number of conical disc spring members and spacers alternately arranged in the housing 12*a*, in other embodiments any desired number of conical disc spring members and spacers may be positioned in the housing, in any arrangement necessary to provide desired force-deflection characteristics or a magnitude of system deflectability for a particular application.

The vibration isolator structure embodiment in FIG. 1 shows the conical disc spring members arranged in a series configuration. For purposes described herein, conical disc spring members are understood to be stacked or arranged in a series configuration when the conical disc spring members are oriented with respect to each other as shown in FIG. 1, with each first end of a conical disc spring member positioned either in contact with or directly opposite and spaced apart from a first end of an adjacent conical disc spring member, and each second end of a conical disc spring member being positioned either in contact with or directly opposite and spaced apart from a second end of an adjacent conical disc spring member. Thus, the conical disc spring members 20 in FIG. 1 have alternating opposite orientations in the housing 12*a* as shown in FIG. 1 (i.e., a repeating sequence of conical disc spring member features encountered when proceeding in a direction from the housing second end 12*c* toward the housing first end 12*b* may be a conical disc spring member first end (such as 922-1), a conical disc spring member second end (such as 924-1), a conical disc spring member second end (such as 924-2), and a conical disc spring member first end (such as 922-2). This arrangement has the general effect of adding spring constants of the conical disc spring members in series, resulting in a lower overall spring constant for the vibration isolator assembly and providing a greater available deflection of the vibration isolator energy-absorbing structure. Also, adding additional conical disc spring members coaxially arranged in this manner to the isolator assembly may further reduce the overall spring constant of the isolator assembly.

Two or more of the conical disc spring members of the vibration isolator may alternatively be arranged in a parallel configuration. Conical disc spring members are stacked or arranged in a parallel configuration when the conical disc spring members are oriented with respect to each other such that all of the conical disc spring members have the same orientation within the housing (i.e., a repeating sequence of conical disc spring member features encountered when proceeding in a direction from the housing second end 12c toward the housing first end 12b may be a conical disc spring member first end, then a conical disc spring member second end, then another conical disc spring member first end, etc., in alternating fashion). This arrangement has the general effect of adding spring constants of the conical disc spring members in parallel, resulting in a higher overall spring constant for the vibration isolator. Also, adding additional conical disc spring members coaxially arranged in this manner to the vibration isolator may further increase the overall spring constant of the vibration isolator.

Figure 3:
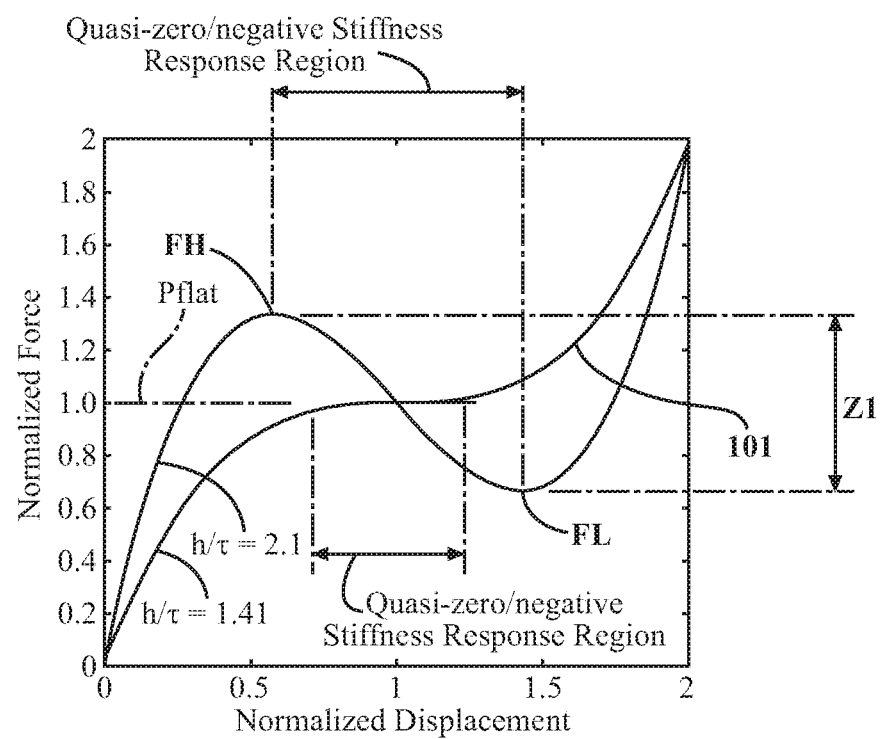
FIG. 3 is a graph illustrating a relationship between a design parameter $h/\tau$ and the force-deflection curve of a conical disc spring member designed in accordance with guidelines set forth herein.

Embodiments of the vibration isolator described herein are structured to provide a quasi-zero/negative stiffness response to a force applied to the vibration isolator when the applied force is within a predetermined range. A conical disc spring member as shown in FIG. 1 is known to have non-linear force-deflection characteristics. Various dimensions and design parameters which may be specified for a given design of a conical disc spring member are shown in FIGS. 2A-2C. In one or more arrangements, these dimensions and design parameters may be specified so as to provide a conical disc spring member having a force-deflection curve shaped generally as shown in FIG. 4D. The deflection of the conical disc spring member represented in FIG. 3 is a deflection of the one of the first end 922 and the second end 924 toward the other one of the first end 922 and the second end 924 along the central axis 926.

One characteristic of this response curve is a region in which a slope of the curve may be zero, near zero, or negative for a certain applied force $P_{flat}$ (or for a range of applied forces centered about $P_{flat}$), and until the applied force increases to a certain level. This force or range of forces defines a "quasi-zero/negative" stiffness region of the force-deflection curve. In this quasi-zero/negative stiffness region, the conical disc spring member may experience a substantial increase in deflection responsive to little or no increase in the applied force ("quasi-zero" stiffness behavior), or the conical disc spring member may actually experience a temporary reduction in force during continued deflection ("negative" stiffness behavior).

It has been found that, when a force (such as a vibration or impulse load, for example) is applied to the conical disc spring member which produces a response of the spring member in the quasi-zero/negative stiffness region, transmission of the force through the conical disc spring member may be eliminated or substantially attenuated. It has been found possible to provide this quasi-zero/negative stiffness region in a given design of conical disc spring member by tailoring the values of certain design parameters and relationships. For example, FIG. 3 shows the effect on the force-deflection curve of varying the parameter h/τ (i.e., the ratio of initial cone height h to shell thickness τ as shown in FIG. 2A. From FIG. 3, it may be seen that a substantially flat or horizontal region of the force-deflection curve 101 may be provided for a certain h/τ ratio. The force $P_{FLAT}$ at which this quasi-zero/negative stiffness response occurs or begins for a given conical disc spring member design may be determined in terms of h and τ using the following relationship:

$$P_{Flat} = \frac{\pi E h \tau^3}{a^2}\left(\frac{\alpha+1}{\alpha-1} - \frac{2}{\ln\alpha}\right)\left(\frac{\alpha}{\alpha-1}\right)^2 \quad (1)$$

where the parameter a is equal to the ratio a/b of mid-surface outer radius a to mid-surface inner radius b, as shown in the parameter definitions of FIGS. 2A-2C.

Normalized force-deflection curves for h/τ ratios of 1.41 and 2.1 are shown in FIG. 3. It may be seen that a substantially flat or horizontal region of the force-deflection curve occurs for the h/τ ratio of 1.41. Also, as seen in FIG. 3, the curve 311 for an h/τ ratio of 2.1 exhibits negative stiffness behavior in the middle portion of the curve.

All of the conical disc spring member embodiments described herein are designed or selected so as to exhibit a quasi-zero/negative stiffness response region in their respective force-deflection curves. In one or more arrangements, conical disc spring members having h/τ ratios in the range 1.41 to 2.1 inclusive are used for the purposes described herein. That is, each conical disc spring member incorporated into the vibration isolator is selected or designed so as to have an h/τ ratio in the range 1.41-2.1 inclusive. Such conical disc spring members have been found to provide quasi-zero/negative stiffness response regions suitable for the purposes described herein.

In one or more arrangements, for purposes of targeting a level of force F1 to be applied to the vibration isolator to produce the quasi-zero/negative stiffness response (or for purposes of designing a conical disc spring member arrangement which will provide quasi-zero/negative stiffness response for a given applied force), an effective quasi-zero/negative stiffness response zone Z1 may be established. As shown in FIG. 3, for a curve with a h/τ ratio of closer to 2.1, for example, such a zone Z1 may be bounded by a highest force FH at which the quasi-zero/negative stiffness response for the arrangement of conical disc spring members of the vibration isolator begins, and a lowest force FL at which the quasi-zero/negative stiffness response for the arrangement of conical disc spring members of the vibration isolator ends. In one or more arrangements, for conical member spring and system design purposes, a conical disc spring member arrangement as shown in FIGS. 1 and 4A-4C and designed in accordance with the principles described herein may be assumed to exhibit quasi-zero/negative stiffness behavior in response to applied forces falling within a range of forces defined in this manner. Thus, a vibration isolator exhibiting quasi-zero/negative stiffness behavior in response to applied forces in zone Z1 may be used in a system where this range of applied forces will be encountered. Alternatively, the location of zone Z1 on the force-deflection curves may be tailored so that the isolator will exhibit quasi-zero/negative stiffness behavior in response to a known, predetermined target range of applied forces. The effective quasi-zero/negative stiffness response zone Z1 may also be defined in an alternative manner.

It has also been found that similar quasi-zero/negative stiffness response regions may be provided in the force-deflection curves of arrangements of two or more conical disc spring members as described herein, responsive to application of a force of a given magnitude and where each individual conical disc spring member of the arrangement has been selected or designed to provide a quasi-zero/negative stiffness response region as shown in FIGS. 3A and 4D. When subjected to a force in this quasi-zero/negative stiffness region, the entire arrangement of conical disc spring members may experience a substantial increase in deflection responsive to little or no increase in the applied force and/or may experience a temporary reduction in applied force during continued deflection. Deflection of an entire arrangement of conical disc spring members may be defined as the combined axial deflection of all of the conical disc spring members of the arrangement responsive to an applied loading of the arrangement. Thus, for example, the deflection of the arrangement may vary during use and with the cyclic loading imposed by an ongoing vibrational load.

It has been found that, when a force of a certain magnitude (such as a vibration or impulse load) is applied to an arrangement of multiple conical disc spring members designed in accordance with the guidelines described above, a response of the arrangement in the quasi-zero/negative stiffness region may be achieved. When the applied vibration forces operate to produce a force-deflection response of the arrangement in the quasi-zero/negative stiffness region, it has been found that transmission of the vibrations from the first element to the second element may be eliminated or substantially attenuated. It has also been found that low frequency vibration forces (in the range 0-10 Hz) experienced by a vehicle chassis may be eliminated or substantially attenuated by a vibration isolator mechanism in accordance with an embodiment described herein. The exact force (or forces) at which quasi-zero/negative stiffness regions will be produced in a given vibration isolator design may depend on the particular arrangement of conical disc spring members.

It has also been found that the extent of the quasi-zero/negative stiffness region of a given arrangement of conical disc spring members may be extended or maximized by enabling each conical disc spring member to resiliently invert (as seen in FIG. 4C) to the greatest degree possible during loading. It is desirable for the extent of the quasi-zero/negative stiffness region to be as large as possible, to maximize the range of operational loads over which a quasi-zero/negative stiffness response may be achieved. The openings (such as opening 22-1f, for example) formed in cavity floors of the spacer base portions described herein may be designed to permit the conical disc spring members positioned over the openings to invert to greatest degree possible during loading, consistent with resilient deflection of the conical disc spring members. Inversion of a conical disc spring member under load may be defined as a condition as shown in FIG. 4C, in which the force applied to the conical disc spring member is such that at least a portion of a first end of a spring member (such as first end 922-1 of spring member 20-1) resiliently deflects from an unstressed state (as shown in FIG. 1) past the flattened configuration shown in FIG. 4B, to a location below a floor (such as 22-1e) of a spacer supporting the conical disc spring member.

Figure 4A:
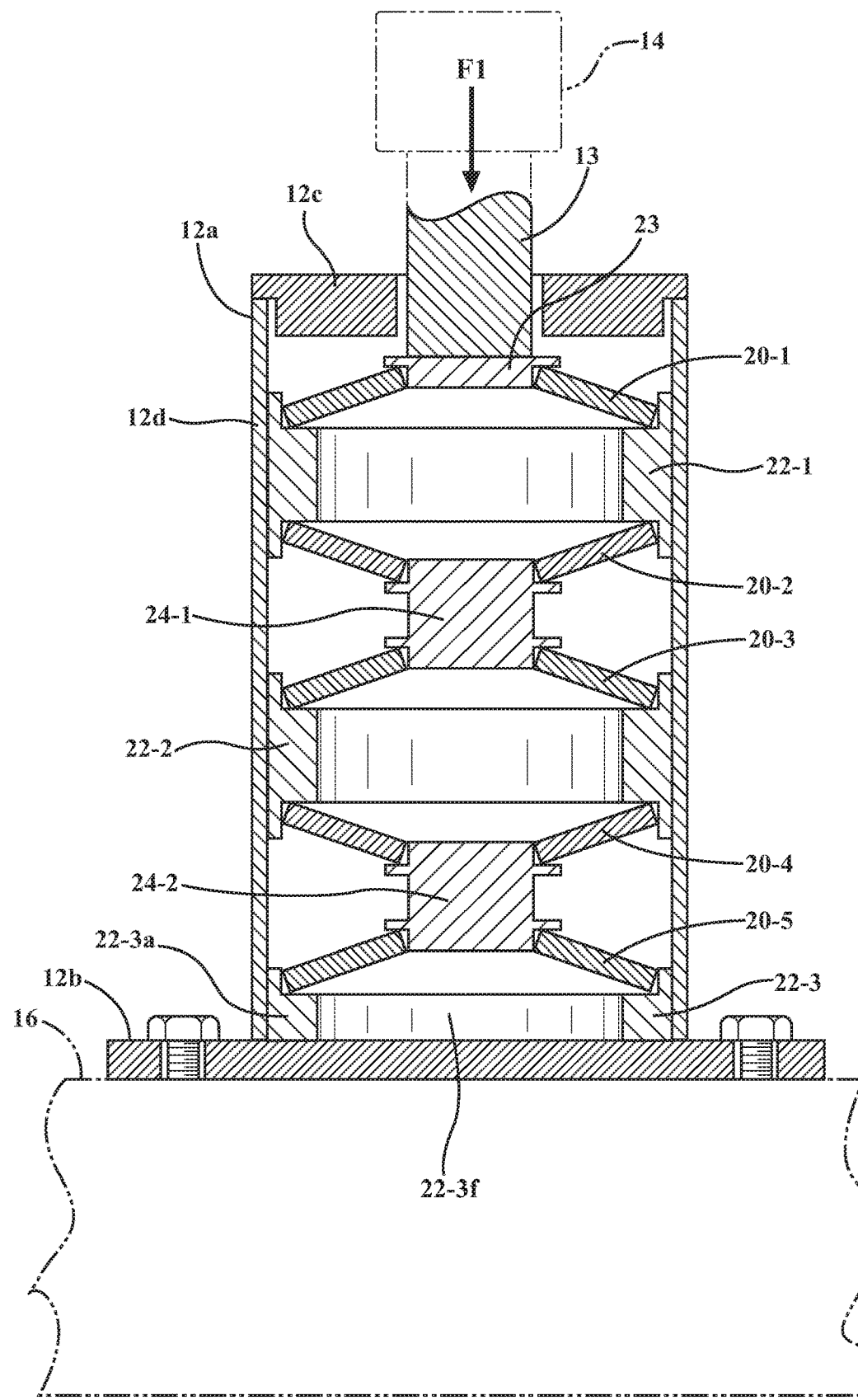
FIG. 4A is a schematic cross-sectional view showing a force F1 applied to the vibration isolator of FIG. 1 so as to deflect the conical disc spring member arrangement in the isolator.
Figure 4B:
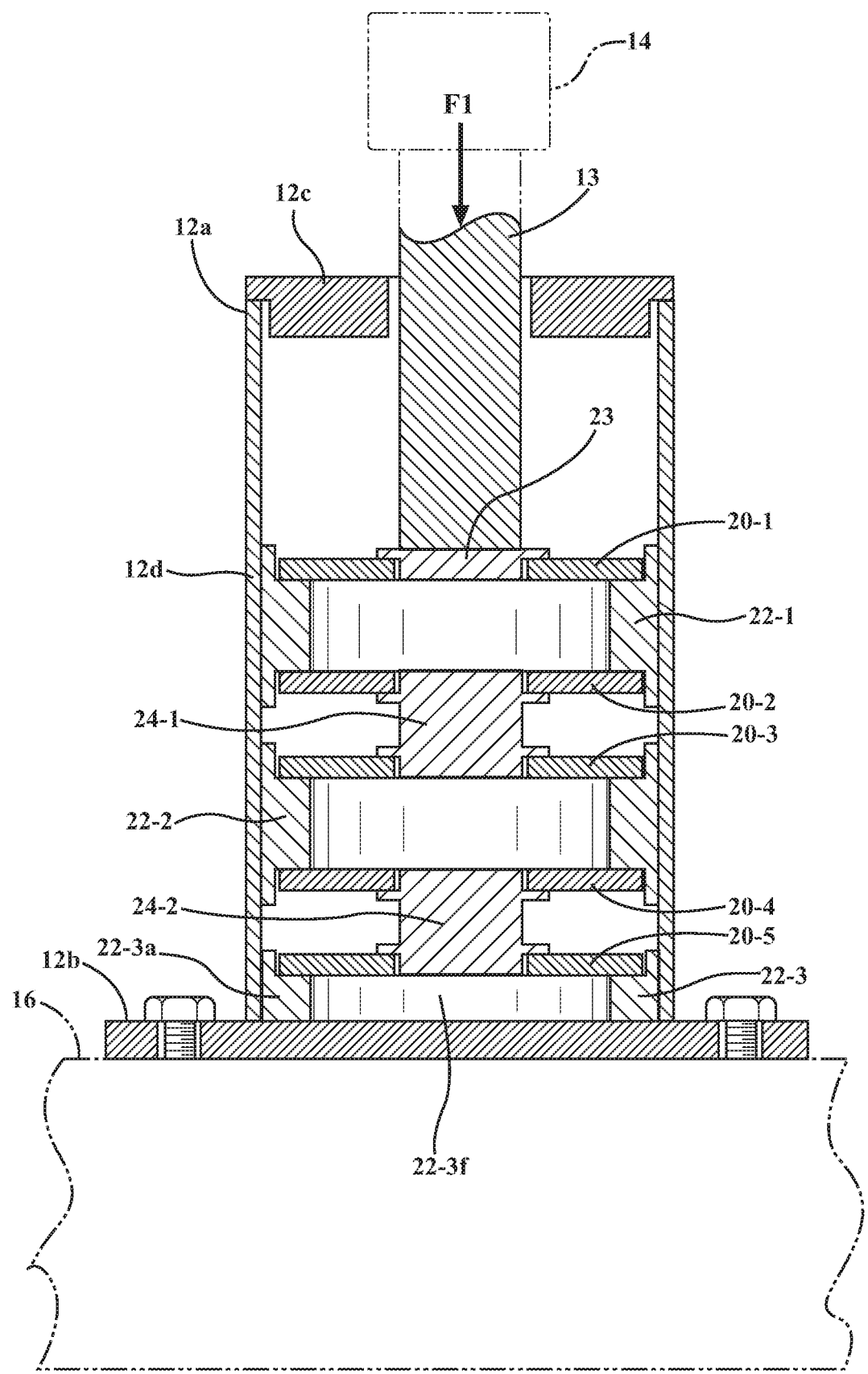
FIG. 4B is the schematic cross-sectional view of FIG. 4A showing the conical disc spring members in the isolator in flattened conditions, responsive to application of a force sufficient to produce a quasi-zero/negative stiffness response of the conical disc spring member arrangement.
Figure 4C:
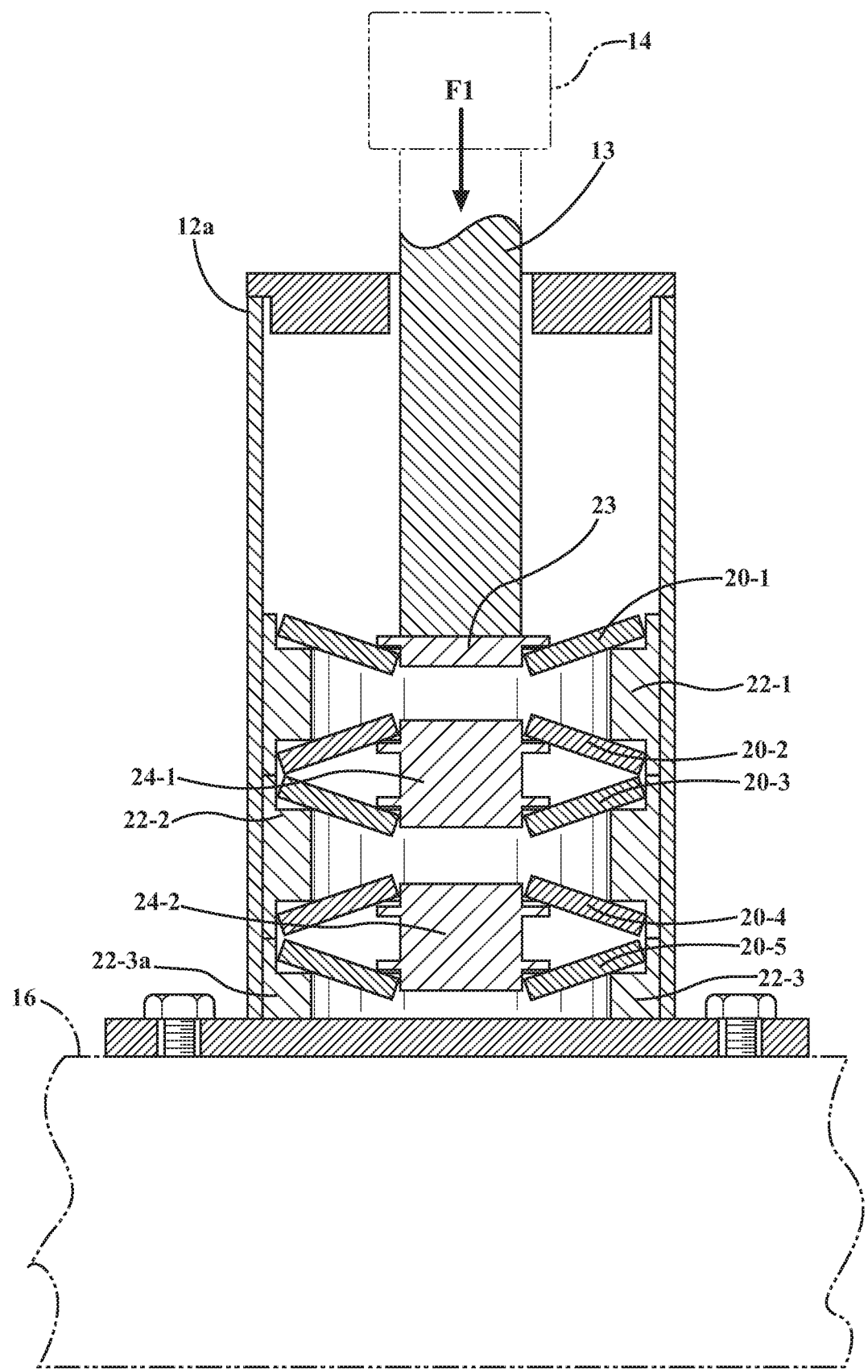
FIG. 4C is the schematic cross-sectional view of FIG. 4A showing the conical disc spring members in the isolator in inverted conditions, responsive to application of a force sufficient exceeding the force needed to produce a quasi-zero/negative stiffness response of the conical disc spring member arrangement.
Figure 4D:
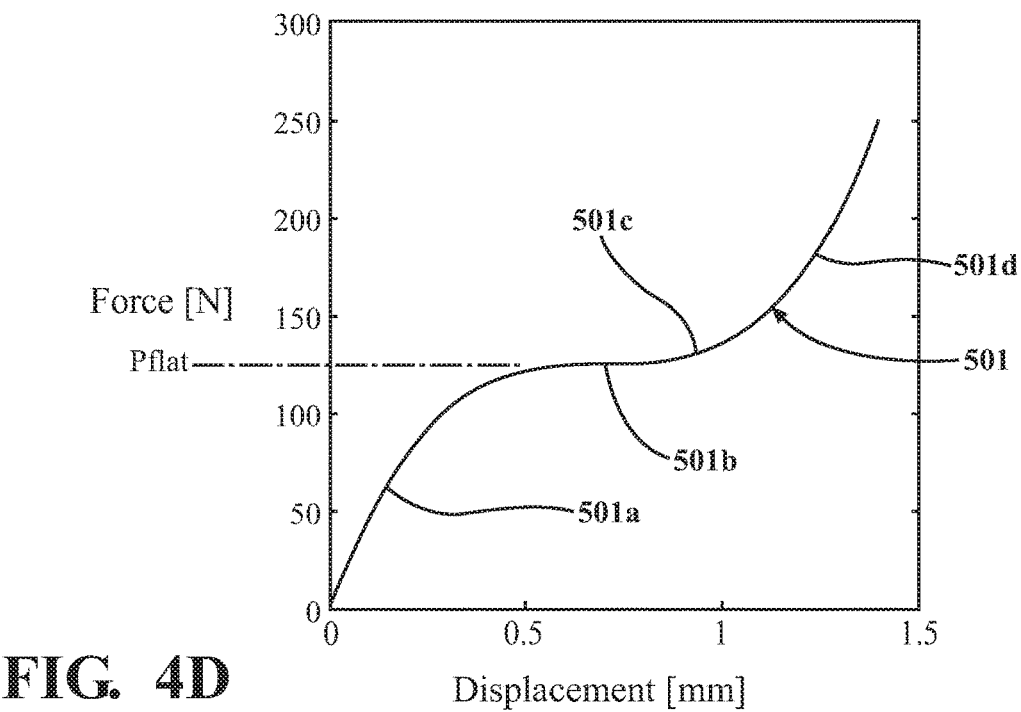
FIG. 4D shows an exemplary force-displacement curve for the conical disc spring member arrangement shown in FIGS. 1 and 4A-4C.

Examples of such an arrangement are shown in FIGS. 4A-4C for the vibration isolator shown in FIG. 1. FIGS. 4A-4C show schematic side cross-sectional views of the vibration isolator embodiment 12 of FIG. 1 incorporating spacers 22-1 and 22-2 which are designed to enable inversion of the conical disc spring members 20-1 through 20-4 coupled to the spacers. FIG. 4D shows an exemplary force-displacement curve for the conical disc spring member arrangement shown in FIGS. 1 and 4A-4C. Behavior of a conical disc spring member arrangement shown in FIG. 1 during deflection and inversion of the spring members 20-1 through 20-5 will be described with reference to FIGS. 4A-4D. The exemplary force-displacement curve shown in FIG. 4D is for purposes of illustrating the force-deflection responses of the conical disc spring member arrangement shown in FIG. 1. The particular force values and deflection values shown may differ according to the details of particular spring member designs, spacer dimensions, and other factors. However, the curve of FIG. 4D provides a qualitative representation of the force-deflection characteristics which may be obtained from the conical disc spring member arrangement shown in FIG. 1.

FIG. 4A shows a force F1 applied to the vibration isolator 12 so as to deflect conical disc spring members 20. As stated previously, conical disc spring members 20 incorporated into the vibration isolator 12 all have the same design/dimensions. Curve 501 of FIG. 4D is a representative force-deflection curve for the conical disc spring member arrangement of isolator assembly 12 during application of the force F1. Forces may be applied to the vibration isolator by movement of the housing 12a relative to the force application member(s) 13 and/or by movement of force application member(s) 13 relative to housing 12a. Forces applied to the vibration isolator via a relative movement of the housing 12a may cause reaction forces to be generated at force application member(s) 13.

Referring to FIGS. 4A and 4D, when force F1 is applied to the conical disc spring member arrangement shown in FIG. 1, the conical disc spring member arrangement may initially deflect as indicated by portion 501a of the curve 501, up to a certain force level (in the example of FIG. 4D, about 125 Newtons). Thus, in the example shown, the quantity $P_{flat}$ is equal to about 125 Newtons. At this force level, a quasi-zero/negative stiffness region 501b of the curve 501 is reached, in which each of the conical disc spring members in the arrangement may experience increased deflection with no additional force and/or a drop in force with further deflection. Also, at this point, the conical disc spring members may have been deflected to conditions similar to that shown in FIG. 4B, in which the conical disc spring members are flat or nearly flat. As the force F1 applied to the conical disc spring members 20 continues to increase, an end of the quasi-zero/negative stiffness region 501b may be reached at a location 501c. After the quasi-zero/negative stiffness region 501b is passed, as the applied force F1 increases, the conical disc spring members 20 may continue to resiliently deflect past the flat state as indicated by portion 501d of the curve 501, until the conical disc spring members are inverted (i.e., oriented in directions opposite to their initial, unloaded configurations shown in FIG. 4A), as shown in FIG. 4C.

The base portion openings (such as opening 22-1f in first spacer 22, for example) may be structured or dimensioned so as to permit the first ends of conical disc spring members 20 to resiliently deflect into the openings and invert without the first ends of the conical disc spring members contacting the associated spacers. This enables maximum resilient deflection of the conical disc spring members 20 during inversion. Thus, the provision of openings in the spacer members enables the conical disc spring members 20 to invert during axial loading of the vibration isolator, thereby providing the energy-absorbing structure with greater resilient deflectability. Also, by permitting the conical disc spring members to invert during applied loading, it is ensured that the conical disc spring members will reach the portion 501d of the curve, thereby ensuring that the extreme upper limit of the quasi-zero/negative stiffness region 501b has been reached and that the entire quasi-zero/negative stiffness region 501b has been utilized during operation of the vibration isolator. This provides the greatest operational flexibility of the vibration isolator during loading.

Using the relationships set forth herein, a conical disc spring member arrangement may be designed for an expected axial loading of the vibration isolator (for example, using analytical and/or experimental methods) so that the expected loading occurs within the force or range of forces encompassed by the quasi-zero/negative stiffness region of the vibration isolator, thereby enabling these forces to be isolated or substantially attenuated by the energy-absorbing structure. For example, conical disc spring members and associated spacers may be provided and arranged as shown in FIG. 1. This conical disc spring member arrangement may be tested by applying an axial loading equal to an anticipated operational loading, and the force-deflection results evaluated. The conical disc spring member arrangement may then be modified as desired, for example, by using conical disc spring members having different dimensions and/or by increasing or decreasing the number of conical disc spring members. Alternative arrangements (i.e., series, parallel, or combinations of series and parallel arrangements) of conical disc spring members may also be evaluated. This process may be continued until an optimum conical disc spring member arrangement is obtained which provides a quasi-zero/negative stiffness region at a force level equal or close to the expected loading. However, any conical disc spring members used should be designed or selected in accordance with the guidelines previously discussed, to help ensure that the resulting conical disc spring member arrangement will provide a quasi-zero/negative stiffness region as previously described.

Design parameters affecting the force-deflection curve of a particular conical disc spring member arrangement may include the number of conical disc spring members in the vibration isolator, the dimensions of the conical disc spring members, the spatial arrangement of the conical disc spring members, and other pertinent parameters. Although the drawings show conical disc spring members arranged in a series configuration, other spatial arrangements may be used to vary and adjust the force-deflection characteristics of the conical disc spring member arrangement for a given loading.

FIGS. 5-7B are schematic views showing the structure and operation of a vibration isolator mechanism (generally designated 11) in accordance with an embodiment described herein. Vibration isolator mechanism 11 is configured to limit transfer of vibrations from a first element (for example, vehicle chassis 16) to a second element (for example, vehicle seat assembly 14) coupled to the first element. FIG. 5 shows vibration isolator mechanism 11 in a condition prior to application of a load to the vehicle seat assembly 14 (i.e., prior to a vehicle occupant sitting in the seat).

Referring to FIGS. 5-7B, vibration isolator mechanism 11 may include a vibration isolator 12 as previously described, a force application mechanism 140 operatively coupled to the vibration isolator 12, and a force adjustment mechanism 160 operatively coupled to the force application mechanism 140. As described previously, vibration isolator 12 is structured to provide a quasi-zero/negative stiffness response to a force applied to the vibration isolator when the applied force is within a predetermined range. This predetermined range of forces may comprise, for example, a tolerance zone of forces centered about an ideal force $P_{flat}$ as determined by the equation (1) previously described.

Force application mechanism 140 may be structured to apply the force to the vibration isolator 12. In the embodiment shown in FIGS. 5-7B, the force application mechanism is structured to transfer the force exerted by a vehicle occupant sitting in the vehicle seat to the vibration isolator. In the embodiment shown, the force application mechanism 140 may include a force application node 144 operatively coupled to the vibration isolator 12 so as to apply the force F1 to the vibration isolator 12, and a force transfer mechanism 142 operatively coupled to the force application node 144 and structured to transfer a load applied acting on the vehicle seat assembly 14 to the force application node 144.

In the embodiment shown, the force transfer mechanism 142 is schematically represented in the form of a lever mechanism 143 rotatably coupled to a relatively static portion of the vehicle (for example, the vehicle chassis 16). However, the force transfer mechanism may have any form suitable for transferring an applied operational load to the force application node 144.

Force adjustment mechanism 160 is structured to adjust the force F1 applied to the vibration isolator 12 by the force application mechanism 140 so that the applied force is within the predetermined range of force values for which the vibration isolator will provide a quasi-zero/negative stiffness response. In the embodiment shown in FIGS. 5-7B, the force adjustment mechanism 160 includes an anchor 164 structured to be adjustably positionable with respect to the vibration isolator 12. A spring member 162 may have a first portion coupled to the anchor 164 and a second portion coupled to the force application node 144. The spring member 162 may be, for example, a conventional coil spring member with opposite ends connected to the anchor and force application node. Alternatively, the spring member 162 may be any other spring member suitable for the purposes described herein. The anchor 164 is structured to be adjustably positionable to tension or compress the spring member 162, as needed to adjust the force F1 applied to the vibration isolator 12.

The anchor 164 may be coupled to (or be incorporated into) an anchor control mechanism 165 which may be configured to move the anchor responsive to commands from computing system 114. The anchor control mechanism 165 may be, for example, a ball screw drive or other linear actuator. For example, the anchor 164 may be connected to (or formed by) the ball screw of a ball screw drive, and an electric motor (not shown) may be configured to rotate the ball nut of the screw drive, thereby controlling linear motion of the ball screw. The ball screw then tensions or compresses the spring member 162, depending on the direction of rotation of the motor.

Figure 8:
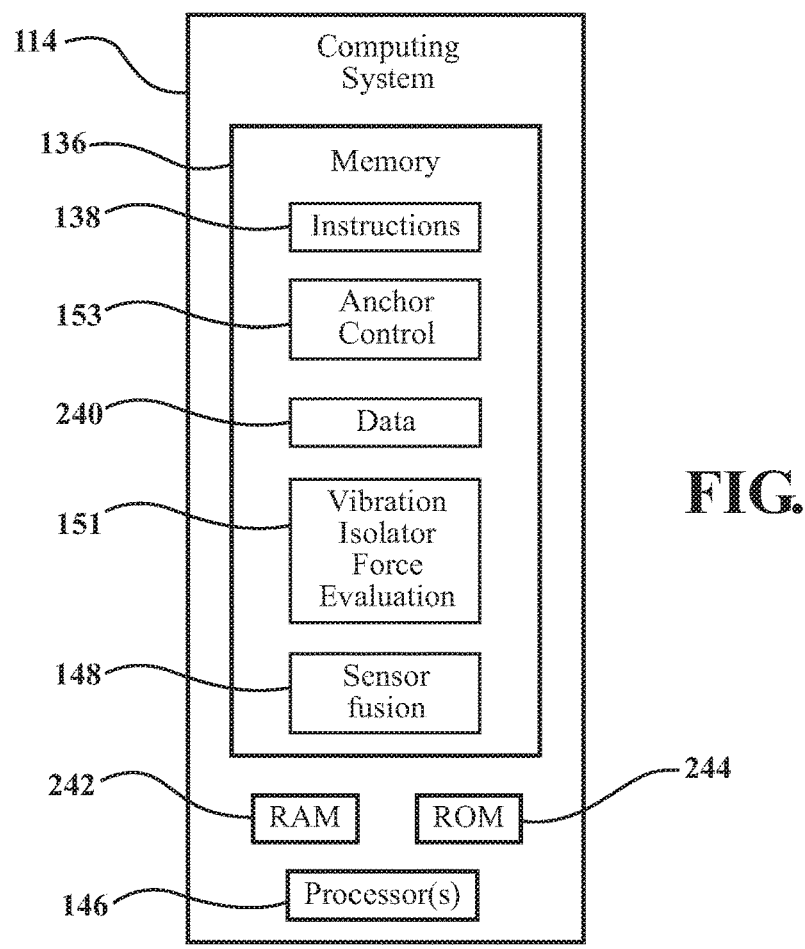
FIG. 8 is a schematic block diagram showing one embodiment of a computing system configured for controlling a force adjustment mechanism to control a force applied to the vibration isolator.
Figure 9:
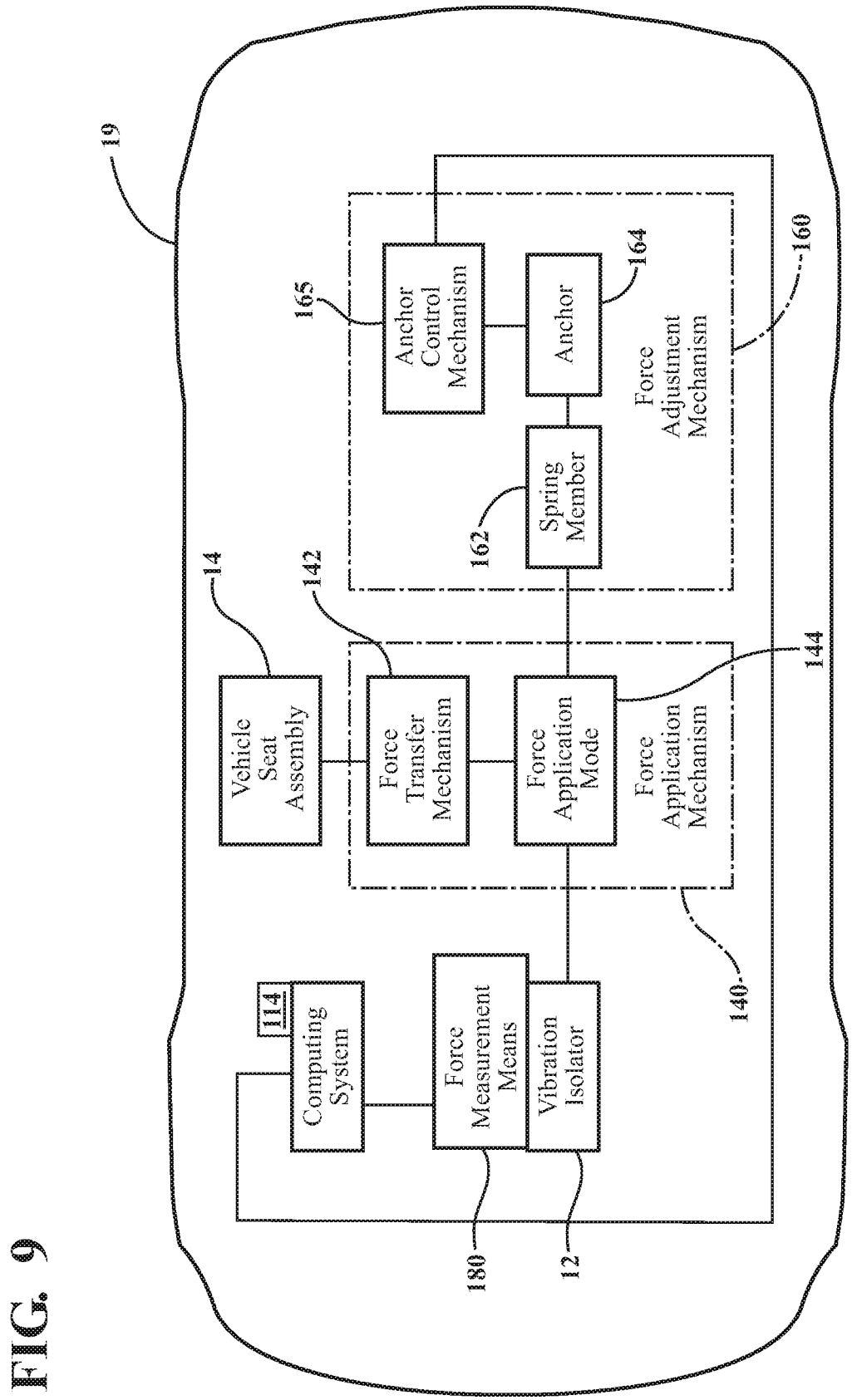
FIG. 9 is a schematic block diagram of a vehicle incorporating a vibration isolator mechanism in accordance with an embodiment described herein.

FIG. 8 is a schematic block diagram showing one embodiment of a computing system 114 configured for controlling the force adjustment mechanism to control the force F1 applied to the vibration isolator. FIG. 9 is a schematic block diagram of a vehicle 19 incorporating a vibration isolator mechanism 11 in accordance with an embodiment described herein. Referring to FIGS. 8 and 9, a force measurement means 180 may be operatively coupled to the vibration isolator 12 and may be configured to determine the force F1 applied to the vibration isolator 12 by the force application mechanism 140. The force measurement means 180 may incorporate suitable acceleration sensor(s), motion sensor(s), or any other suitable sensor(s) or mechanisms usable for determining the force applied to the conical spring disc member arrangement to deflect the disc members.

Computing system 114 may be operatively coupled to the force measurement means 180. Computing system 114 may be configured to compare the force F1 applied to the vibration isolator 12 by the force application mechanism 140 with the predetermined range desired for achieving the quasi-zero/negative deflection response of the vibration isolator. Computing system 114 may be configured to, responsive to this comparison, control the force adjustment mechanism 160 so as to adjust the force F1 applied to the vibration isolator 12 by the force application mechanism 140 to a value within the predetermined range.

The computing system 114 may be operatively connected to the other vehicle systems and elements and may be configured so as to control and operate the vehicle 19 and its components as described herein. The computing system 114 may be configured to control at least some systems and/or components autonomously (without user input) and/or semi-autonomously (with some degree of user input). The computing system may also be configured to control and/or execute certain functions autonomously and/or semi-autonomously. The computing system 114 may additionally or alternatively include components other than those shown and described. The computing system 114 may control the functioning of the vehicle 19 based on inputs and/or information received from various sensors incorporated into the vehicle and other information.

FIG. 8 illustrates a block diagram of an exemplary computing system 114 according to one or more illustrative embodiments of the disclosure. The computing system 114 may have some or all of the elements shown in FIG. 8. In addition, the computing system 114 may include additional components as needed or desired for particular applications. The computing system 114 may also represent or be embodied in a plurality of controllers or computing devices that may process information and/or serve to control individual components or systems of the vehicle 19 in a distributed fashion.

The computing system 114 may include one or more processors 146 (which could include at least one microprocessor) for controlling overall operation of the computing system 114 and associated components, and which execute instructions stored in a non-transitory computer readable medium, such as the memory 136. "Processor" means any component or group of components that are configured to execute any of the processes and/or process steps described herein or any form of instructions to carry out such processes/process steps or cause such processes/process steps to be performed. The processors(s) may control aspects of vehicle operation as described herein in accordance with instructions stored in a memory. The processor(s) 146 may be implemented with one or more general-purpose and/or one or more special-purpose processors. The processor(s) 146 can include at least one hardware circuit (e.g., an integrated circuit) configured to carry out instructions contained in program code. In arrangements in which there is a plurality of processors 146, such processors can work independently from each other or one or more processors can work in combination with each other. In one or more arrangements, the processor(s) 146 can be a main processor of the vehicle 19. For instance, the processor(s) 146 can be part of an electronic control unit (ECU) and can act as a controller in the vehicle 19.

In one or more arrangements, the computing system 114 may include RAM 242, ROM 244, and/or any other suitable form of computer-readable memory. The memory 136 may comprise one or more computer-readable memories. Computer-readable storage or memory 136 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. The memory 136 can be a component of the computing system 114, or the memory can be operatively connected to the computing system 114 for use thereby. The term "operatively connected," as used throughout this description, can include direct or indirect connections, including connections without direct physical contact.

The memory 136 may contain data 240 and/or instructions 138 (e.g., program logic) executable by the processor(s) 146 to execute various functions of the vehicle 19. The memory 136 may contain additional instructions as well, including instructions to transmit data to, receive data from, interact with, or control one or more of the vehicle systems and/or components described herein (for example, force adjustment mechanism 160).

Computing system 114 may incorporate a sensor fusion capability 148 configured to combine or integrate data received from different sensors, for further use and/or interpretation by elements of the computing system. Computing system 114 may incorporate a vibration isolator force evaluation capability 151 configured to compare a measured value of the force F1 applied to the vibration isolator 12 to a force at which a quasi-zero/negative stiffness response may be achieved and/or to a range of forces within which a quasi-zero/negative stiffness response may be achieved. computing system 114 may also incorporate an anchor control capability 153 configured for controlling movement and other operations of anchor 164 so as to adjust the tension or compression in spring member 162 needed to apply a desired force to the vibration isolator 12.

The various capabilities described herein may be embodied in (and/or executable using) hardware, software, or a combination of hardware and software. Instructions for performing the various capabilities described herein may be stored in a memory. Although several capabilities are explicitly described as being incorporated into the computing system 114, the computing system 114 may also include additional capabilities which may facilitate performance of the functions described herein.

Figure 10:
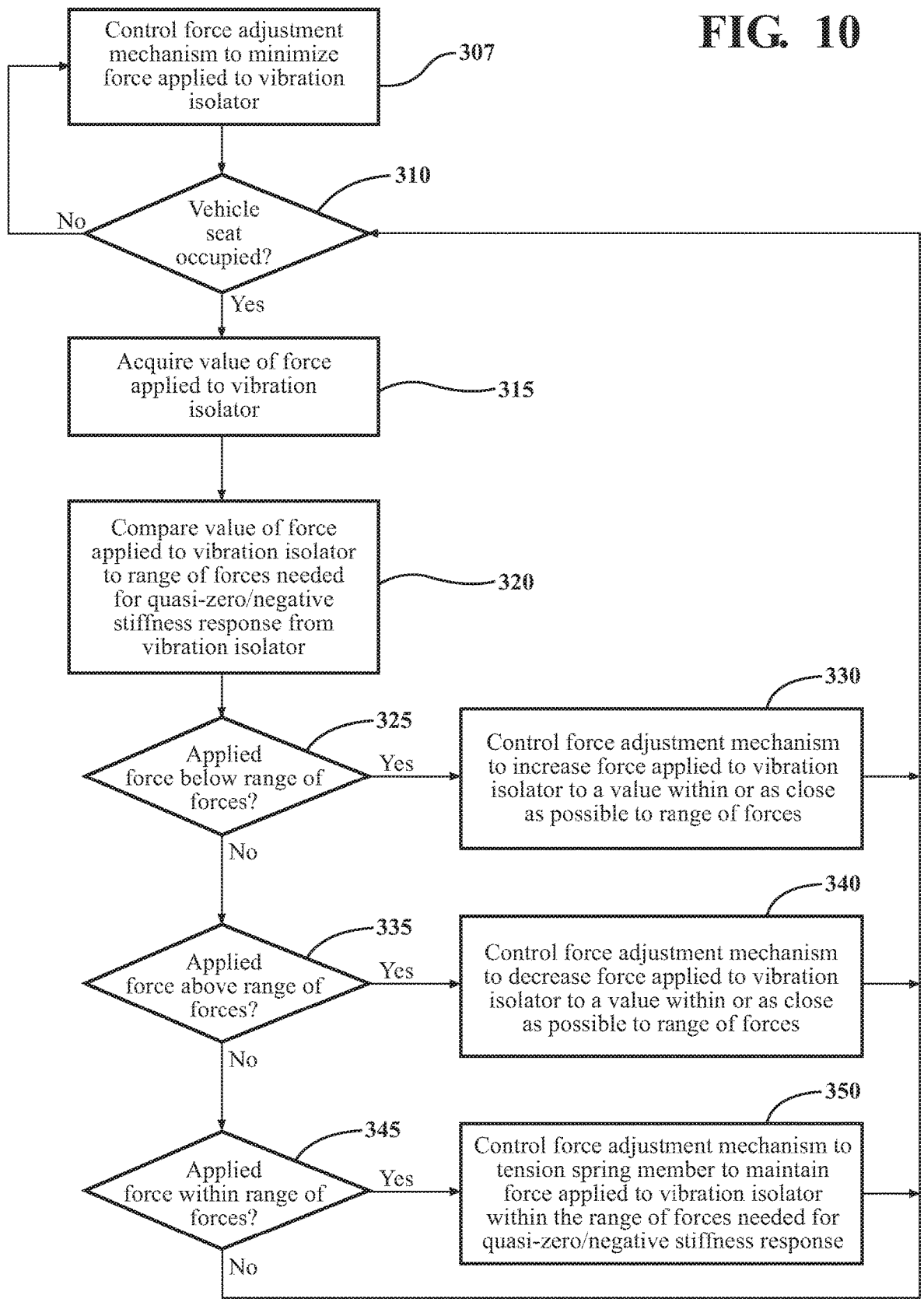
FIG. 10 is a flow diagram illustrating operation of a force adjustment mechanism to adjust a force applied by a force application mechanism to a force at which a quasi-zero/negative stiffness response of the conical disc spring member arrangement may be achieved.

FIG. 10 is a flow diagram illustrating operation of the vibration isolator mechanism 11 shown in FIGS. 5-7B to implement a method for limiting transfer of vibration forces from a first element (for example, the vehicle chassis 16) to a second element (for example, the vehicle seat assembly 14) coupled to the first element.

Referring to FIGS. 5-7 and 10, in block 310, the computing system 114 may determine if the vehicle seat (not shown) of the vehicle seat assembly 14 is occupied. The presence or absence of a seat occupant may be detected and constantly updated using a known seat occupancy sensor (not shown). If it is determined that the seat is unoccupied, the computing system 114 may control the force adjustment mechanism 160 to minimize the force F1 applied to the vibration isolator 12.

Without the additional loading provided by the force adjustment mechanism 160, the force F1 seen by the vibration isolator 12 would be the load transferred to the isolator by the force transfer mechanism 142, which would be equal to (or correspond to) the load on the vehicle seat. In most cases, compression in the spring member 162 may apply some force to the vibration isolator 12 prior to loading of the vehicle seat. Thus, the applied force F1 detected by force measurement means 180 may include the force applied by the spring member 162 prior to seat loading. When the vehicle seat is not loaded, the force adjustment mechanism 160 may be controlled by the computing system 114 so that the force applied to the vibration isolator 12 due to the spring member 162 is minimized. This may be done by controlling the position of the anchor 164 relative to the vibration isolator 12.

When a vehicle occupant sits in a vehicle seat (not shown) of the vehicle seat assembly 14, a force applied to the vehicle seat is transferred to the vibration isolator 12 via the force transfer mechanism 142 and the force application node 144. This force F1 applied to the vibration isolator 12 is detected by the force measurement means 180 and the magnitude of the force may be transmitted to the computing system 114.

In block 315, the computing system may receive or otherwise acquire the force value from the force measurement means 180.

In block 320, the computing system 114 may compare the applied force detected by force measurement means 180 with a predetermined range of forces within which a quasi-zero/negative stiffness response (or a response very close to a quasi-zero/negative stiffness response) may be achieved, for the particular design of vibration isolator incorporated into the vibration isolator mechanism 11.

Figure 7A:
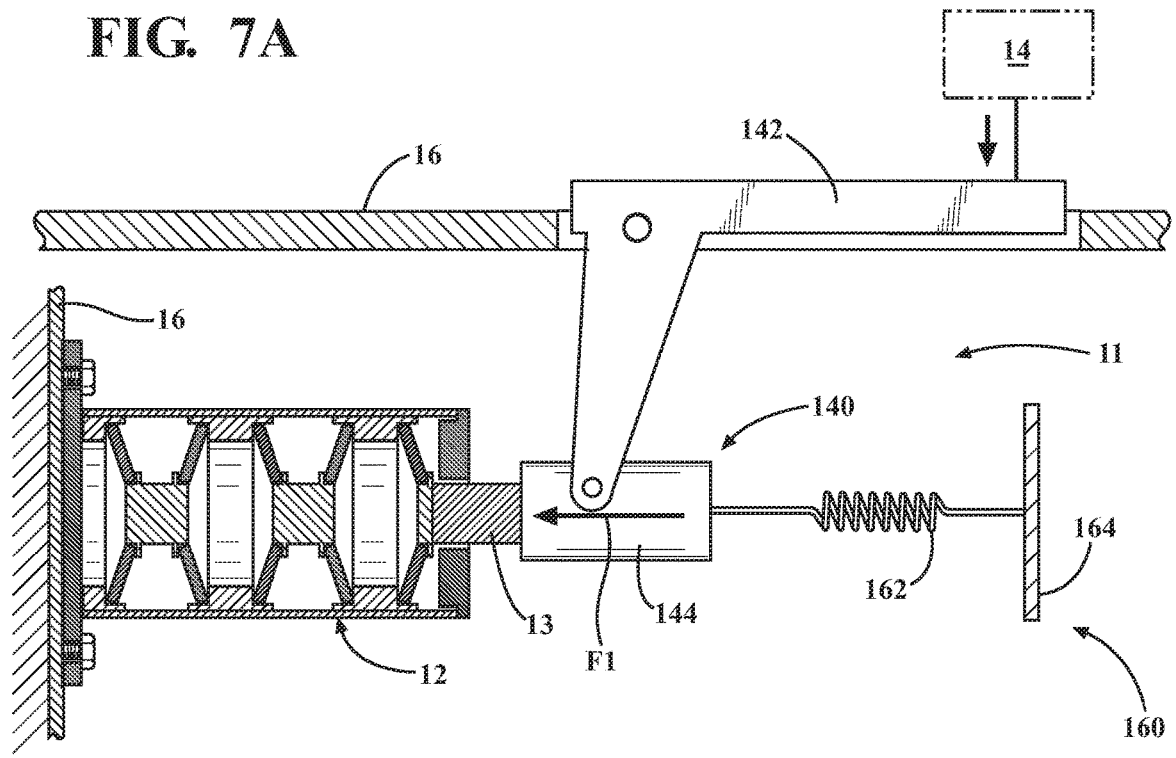
FIG. 7A is the schematic diagram of FIG. 5 showing the vibration isolator mechanism during a loading below a force at which a quasi-zero/negative stiffness response of the conical disc spring member arrangement may be achieved.
Figure 7B:
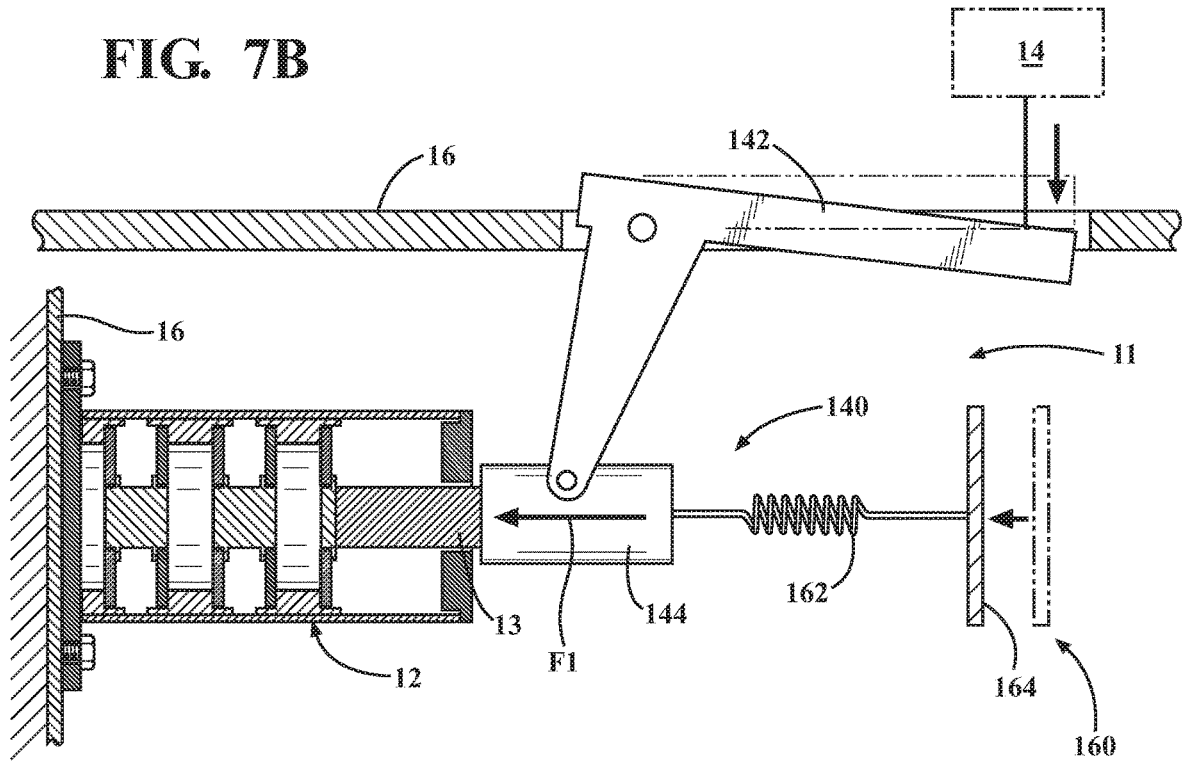
FIG. 7B is the schematic diagram of FIG. 6A, showing application of a force by a force adjustment mechanism to increase the force applied to the vibration isolator to a force at which a quasi-zero/negative stiffness response of the conical disc spring member arrangement may be achieved.

In block 325, if it is determined that the applied force F1 is below the predetermined range of forces within which a quasi-zero/negative stiffness response may be achieved (a situation as shown in FIG. 7A, where the applied force is insufficient to deflect the conical disc spring members 20 so as to flatten the spring members as shown in FIG. 4B), the computing system may (in block 330) control the force adjustment mechanism 160 to increase the force F1 applied to the vibration isolator 12. This may be done by controlling the anchor 164 so as to move the anchor toward the vibration isolator 12, thereby further compressing the spring member 162 and increasing the force applied to the vibration isolator 12 until an applied force F1 within the desired range (or as close as possible to the desired range) is reached, as shown in FIG. 7B. For example, for an applied force F1 below the predetermined range of forces within which a quasi-zero/negative stiffness response may be achieved, the applied force may lie along portion 501a of force-deflection curve 501 shown in FIG. 4D. By controlling the force adjustment mechanism 160 to increase the applied force to a force corresponding to portion 501b of the curve, a quasi-zero/negative stiffness response to the applied load may be provided.

If it is determined that the applied force F1 is not below the predetermined range of forces within which a quasi-zero/negative stiffness response may be achieved, control may move to block 335. In block 335, if it is determined that the applied force F1 is above the predetermined range of forces within which a quasi-zero/negative stiffness response may be achieved (a situation as shown in FIG. 6A, where the applied force deflects the conical disc spring members to inversion, for example as shown in FIG. 4C), the computing system may (in block 340) control the force adjustment mechanism 160 to decrease the force F1 applied to the vibration isolator 12. This may be done by controlling the anchor 164 so as to move the anchor in a direction away from the vibration isolator 12, thereby reducing the spring member compression (or tensioning the spring member) to decrease the force applied to the vibration isolator 12 until an applied force within the desired range (or as close as possible to the desired range) is reached, as shown in FIG. 6B. For example, for an applied force F1 above the predetermined range of forces within which a quasi-zero/negative stiffness response may be achieved, the applied force may lie along portion 501d of force-deflection curve 501 shown in FIG. 4D. In this condition, the conical disc spring members 20 may already be inverted as shown in FIG. 4C. By controlling the force adjustment mechanism 160 to decrease the applied force F1 to a force corresponding to portion 501b of the curve, a quasi-zero/negative stiffness response to the applied load may be provided.

If it is determined that the applied force F1 is not above the predetermined range of forces within which a quasi-zero/negative stiffness response may be achieved, control may transfer to block 345. In block 345, if it is determined that the applied force F1 is within the predetermined range of forces within which a quasi-zero/negative stiffness response may be achieved, the computing system may (in block 350) control the force adjustment mechanism 160 so as to maintain the force F1 within the range of forces needed to provide the quasi-zero/negative stiffness response. This may involve simply maintaining the anchor in its current position. However, the force F1 applied to the vibration isolator 12, the vehicle seat occupancy, and other parameters may be constantly monitored to detect changes as soon as they occur.

The force F1 applied to the vibration isolator 12 may be controlled in the manner described above during movement of the vehicle 19 along road surface. In one or more arrangements, the system 11 described may be configured to attenuate low-frequency vibrations experienced by the vehicle chassis in the range 0-10 Hz that would otherwise be transmitted to the occupied vehicle seat.

In the preceding detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The various elements of the vibration isolator embodiments described herein may be formed from any material or materials suitable for the purposes described. For example, the conical spring disc members may be formed from a metallic material such as a steel, or any other suitable material. In one or more arrangements, the spacers are formed from a polymer material.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vibration isolator mechanism for limiting transfer of vibrations from a first element to a second element coupled to the first element, the vibration isolator mechanism comprising:
    a vibration isolator including at least one conical disc spring member structured to provide a quasi-zero/negative stiffness response to a force applied to the vibration isolator when the applied force is within a predetermined range, and a first spacer coupled to the at least one conical disc spring member, the first spacer being structured to enable inversion of the at least one conical disc spring member during loading of the at least one conical disc spring member;
    a force application mechanism structured to apply a force to the vibration isolator; and
    a force adjustment mechanism structured to adjust the force applied to the vibration isolator by the force application mechanism so that the applied force is within the predetermined range.

2. The vibration isolator mechanism of claim 1 wherein the first element is a vehicle chassis and the second element is a vehicle seat coupled to the vehicle chassis.

3. The vibration isolator mechanism of claim 2 wherein the force application mechanism is structured to transfer a load applied by a vehicle occupant on the vehicle seat to the vibration isolator.

4. The vibration isolator mechanism of claim 1 wherein the force application mechanism comprises a force application node operatively coupled to the vibration isolator so as to apply the force to the vibration isolator, and a force transfer mechanism operatively coupled to the force application node and structured to transfer a load applied to the second element to the force application node.

5. The vibration isolator mechanism of claim 4 wherein the force transfer mechanism comprises a lever mechanism rotatably coupled to the first element.

6. The vibration isolator mechanism of claim 1 wherein the first spacer includes a base portion having a first side, the base portion first side defining a first cavity structured to receive therein a second end of the at least one conical disc spring member, the first cavity having a first cavity floor, a second end of the first conical disc spring member being positioned in contact with the first cavity floor, the first cavity floor including a first opening formed therein and positioned so as to reside opposite the first end of the at least one conical disc spring member when the second end of the at least one conical disc spring member is in contact with the first cavity floor, the first opening being structured to receive at least a portion of a first end of the at least one conical disc spring member therein during an inversion of the at least one conical disc spring member during loading of the at least one conical disc spring member.

7. The vibration isolator mechanism of claim 6 further comprising at least one additional conical disc spring member positioned adjacent the at least one conical disc spring member, the at least one additional conical disc spring member having a first end including a central opening of the conical disc spring member, and a second end opposite the first end, wherein the first spacer is interposed between the at least one conical disc spring member and the at least one additional conical disc spring member, the first spacer base portion also having a second side, the base portion second side defining a second cavity structured to receive therein a second end of the at least one additional conical disc spring member the second cavity having a second cavity floor, a second end of the at least one additional conical disc spring member being positioned in contact with the second cavity floor, the second cavity floor including a second opening formed therein and positioned so as to reside opposite the first end of the at least one additional conical disc spring member when the second end of the at least one additional conical disc spring member is in contact with the second cavity floor, the second opening being structured to receive at least a portion of a first end of the at least one additional conical disc spring member therein during an inversion of the at least one additional conical disc spring member during loading of the at least one additional conical disc spring member.

8. The vibration isolator mechanism of claim 7 wherein the at least one conical disc spring member and the at least one additional conical disc spring member are arranged in a series configuration.

9. The vibration isolator mechanism of claim 1 wherein the force adjustment mechanism comprises:
    an anchor structured to be adjustably positionable with respect to the vibration isolator; and
    a spring member coupled to the anchor and to the force application mechanism, and wherein the anchor is structured to be adjustably positionable to tension or compress the spring member.

10. A vehicle comprising a vibration isolator mechanism for limiting transfer of vibrations from a first portion of the vehicle to a second portion of the vehicle, the vibration isolator mechanism including a vibration isolator having at least one conical disc spring member structured to provide a quasi-zero/negative stiffness response to a force applied to the vibration isolator when the applied force is within a predetermined range, the vibration isolator also including a first spacer coupled to the at least one conical disc spring member, the first spacer being structured to enable inversion of the at least one conical disc spring member during loading of the at least one conical disc spring member, the vehicle also including a force application mechanism structured to apply a force to the vibration isolator, and a force adjustment mechanism structured to adjust the force applied to the vibration isolator by the force application mechanism so that the applied force is within the predetermined range.

11. The vehicle of claim 10 further comprising:
a force measurement means operatively coupled to the vibration isolator and configured to determine a force applied to the vibration isolator by the force application mechanism; and
a computing system operatively coupled to the force measurement means, the computing system being configured to compare the force applied to the vibration isolator by the force application mechanism with the predetermined range and, responsive to the comparison, control the force adjustment mechanism so as to adjust the force applied to the vibration isolator by the force application mechanism to a value within the predetermined range.

12. A method, in a vibration isolator, for limiting transfer of vibration forces from a first element to a second element coupled to the first element, the vibration isolator including at least one conical disc spring member structured to provide a quasi-zero/negative stiffness response to a force applied to the vibration isolator when the applied force is within a predetermined range and a first spacer coupled to the at least one conical disc spring member, the first spacer being structured to enable inversion of the at least one conical disc spring member during loading of the at least one conical disc spring member, the method comprising steps of:
applying, by a force application mechanism, a force to the vibration isolator;
adjusting, by a force adjustment mechanism, the force applied to the vibration isolator by the force application mechanism so that the applied force is within the predetermined range; and
controlling, during application of vibration forces to the first element and by the force adjustment mechanism, the force applied to the vibration isolator by the force application mechanism so as to maintain the force applied to the vibration isolator to a value within the predetermined range.

13. The method of claim 12 wherein the step of controlling the force adjustment mechanism comprises steps of:
determining the force applied to the vibration isolator by the force application mechanism;
comparing the force applied to the vibration isolator by the force application mechanism with the predetermined range;
if the force applied to the vibration isolator by the force application mechanism is below the predetermined range, controlling the force adjustment mechanism to apply a force to the force application mechanism so as to increase the force applied by the force application mechanism to the vibration isolator to a value within the predetermined range;
if the force applied to the vibration isolator by the force application mechanism is above the predetermined range, controlling the force adjustment mechanism to apply a force to the force application mechanism so as to decrease the force applied by the force application mechanism to the vibration isolator to a value within the predetermined range; and
if the force applied to the vibration isolator by the force application mechanism is within the predetermined range, controlling the force adjustment mechanism to apply a force to the force application mechanism so as to maintain the force applied by the force application mechanism to the vibration isolator at a value within the predetermined range.

* * * * *